United States Patent
Martin et al.

(10) Patent No.: US 10,371,028 B2
(45) Date of Patent: Aug. 6, 2019

(54) METHOD AND SYSTEM FOR A PARTICULATE FILTER HAVING A BYPASS

(71) Applicant: Ford Global Technologies, LLC, Dearborn, MI (US)

(72) Inventors: Douglas Raymond Martin, Canton, MI (US); John Eric Rollinger, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 46 days.

(21) Appl. No.: 15/650,041

(22) Filed: Jul. 14, 2017

(65) Prior Publication Data

US 2019/0017423 A1    Jan. 17, 2019

(51) Int. Cl.
 *F01N 9/00*   (2006.01)
 *F01N 3/031*   (2006.01)

(52) U.S. Cl.
 CPC ............. *F01N 3/031* (2013.01); *F01N 9/002* (2013.01); *F01N 2410/02* (2013.01); *F01N 2410/08* (2013.01); *F01N 2550/12* (2013.01)

(58) Field of Classification Search
 USPC .......... 60/274, 285, 286, 295, 297, 303, 311
 See application file for complete search history.

(56) References Cited

U.S. PATENT DOCUMENTS

| | | | |
|---|---|---|---|
| 5,207,990 A * | 5/1993 | Sekiya | F01N 3/0253 422/169 |
| 5,941,066 A * | 8/1999 | Araki | F01N 3/023 55/284 |
| 6,367,246 B1 * | 4/2002 | Hirota | B01D 53/9445 60/295 |
| 8,887,492 B2 * | 11/2014 | Nakata | F01N 3/0807 60/277 |
| 9,297,348 B2 | 3/2016 | Kerns et al. | |
| 9,482,125 B2 | 11/2016 | Gonze et al. | |
| 9,920,679 B2 * | 3/2018 | Ulrey | F01N 3/023 |
| 2008/0276604 A1 * | 11/2008 | Hosaka | F01N 3/0231 60/295 |
| 2011/0072800 A1 | 3/2011 | Bidner et al. | |
| 2012/0124977 A1 | 5/2012 | Choe | |
| 2015/0240681 A1 | 8/2015 | Fritz et al. | |
| 2016/0222898 A1 | 8/2016 | Ulrey et al. | |

OTHER PUBLICATIONS

Ulrey, J. et al., "Method and System for Reducing Particulate Emissions," U.S. Appl. No. 15/041,689, filed Feb. 11, 2016, 42 pages.
Ulrey, J. et al., "Method and System for a HC Trap," U.S. Appl. No. 15/280,868, filed Sep. 29, 2016, 54 pages.

* cited by examiner

*Primary Examiner* — Binh Q Tran
(74) *Attorney, Agent, or Firm* — Julia Voutyras; McCoy Russell LLP

(57) ABSTRACT

Methods and systems are provided for an emission control device that includes a particulate filter with a bypass. In one example, a method includes bypassing the particulate filter when the exhaust gas has a decreased soot load and when the particulate filter has a decreased soot storage. The method further includes reducing the filter bypass flow and terminating or adjusting a deceleration fuel shut-off operation due to an exhaust temperature proximate to the particulate filter being above a threshold.

20 Claims, 5 Drawing Sheets

METHOD AND SYSTEM FOR A PARTICULATE FILTER HAVING A BYPASS

FIELD

The present description relates generally to methods and systems for controlling particulate emissions from a vehicle engine that includes a particulate filter with an adjustable bypass around the particulate filter.

BACKGROUND/SUMMARY

Emission after-treatment devices, or emission control devices (ECD), may be used to treat exhaust gas of internal combustion engines in order to reduce the amount of particulate emissions to atmosphere. In particular, emission control devices may include particulate filters (PF), oxidation catalysts, and nitrogen oxide (NOx) catalysts. Particulate matter, which is largely made up of carbon particles from incomplete combustion (e.g., soot), may collect in particulate filters, causing a gradual, increasing restriction of exhaust gas flow and reducing fuel economy as the particulate matter accumulates in the particulate filters. It will be appreciated that there are numerous types of particulate filters, including diesel particulate filters and gasoline particulate filters. In order to periodically purge or regenerate a particulate filter of the accumulated soot to reduce exhaust backpressure, measures may be taken that result in an increase in the exhaust gas temperature above a predetermined level to regeneration temperatures (e.g. above 450° C., for example) in order to incinerate the carbon particles accumulated in the filter to form gaseous products. In addition to soot, however, the exhaust gas also carries incombustible solid material that may remain after a regeneration, referred to as ash, and which may remain trapped in the PF for the remainder of its useful life. Ash is derived primarily from lubricating oil entering the combustion chamber or exhaust ports. Other sources include corrosion from the exhaust manifold and debris from the upstream catalytic converter. As particulate matter (e.g., ash and soot) accumulates in the PF, exhaust backpressure may increase, adversely affecting fuel economy. Because the stored ash may remain within the PF after regeneration, the exhaust backpressure created by the PF may be partially reduced as a result of regeneration, but may not be entirely eliminated. As such, the ash may continue to contribute to the exhaust backpressure on the engine, thereby reducing engine torque output and/or engine fuel economy.

Under some operating conditions, a vehicle may operate with exhaust gases reaching high enough temperatures to passively perform a particulate filter regeneration without selective or intrusive control of engine parameters to achieve the elevated exhaust gas temperatures for the purpose of particulate filter regeneration. In some instances, however, an active regeneration may be performed, where engine controls are adjusted in order to selectively increase the exhaust temperatures to facilitate particulate filter regeneration. Additionally, particulate filter regeneration may occur during deceleration fuel shut-off (DFSO) operating conditions. During DFSO operation, fuel injection to one or more cylinders is disabled during select operating conditions, such as a tip-out when coasting the vehicle down a hill, in order to reduce fuel consumption and increase fuel economy. The engine continues to rotate during DFSO, and thus air may still flow through the engine, to the exhaust, during DFSO operation, thereby increasing an oxygen concentration of gases flowing to the particulate filter. The increased oxygen concentration in the exhaust gas may promote a particulate filter regeneration for a particulate filter at regeneration temperatures.

Attempts to manage particulate filter regeneration conditions, including a temperature of the particulate filter, during DFSO include adjusting a length of a deceleration fuel shut-off event and a total number of activated and deactivated cylinders during the DFSO based on a particulate filter temperature change during a particulate filter regeneration. Further, fuel may be injected into one or more cylinders during DFSO in order to decrease the oxygen concentration of the exhaust gas flowing to the particulate filters (e.g., firing one or more cylinders at stoichiometry). Still further, the firing cylinders may be operated at a variable air/fuel ratio (e.g., lambda greater than, less than, or equal to 1). By combusting the air mixture, oxygen is consumed and the relative percent oxygen of the exhaust gas is significantly decreased, ultimately decreasing a rate of increase for the particulate filter temperature. One example approach is shown by Ulrey et al. in U.S. Application 2016/0222898. Therein, Ulrey determines whether a particulate matter reaction length (e.g., particulate filter regeneration) is greater than the length of DFSO, then one or more cylinders of an engine may be activated during DFSO to reduce an oxygen flow and extend a length of DFSO to match the reaction rate of soot. In this way, the oxygen flow rate is decreased while still performing a particulate filter regeneration during DFSO. By doing this, the filter may not exceed a maximum allowable particulate filter temperature, thereby reducing the likelihood of degradation of the particulate filter while completing the particulate filter regeneration.

However, the inventors herein have recognized potential issues with such systems. As one example, indiscriminately routing exhaust gas through the particulate filter, even under operating conditions when no net gain in emissions reductions or fuel economy is achieved, unnecessarily shortens the life of the particulate filter. Further, because DFSO may be controlled based on the temperature of the particulate filter when exhaust gas is routed through the particulate filter, this may disadvantageously limit the use of DFSO, thereby limiting opportunities to further increase fuel economy and reduce emissions by operating in a DFSO mode.

In one example, the issues described above may be addressed by a method for an engine, comprising: responsive to decreased soot generation or decreased soot storage, flowing gasoline combustion exhaust gas to a particulate filter with increased filter bypass flow even when an exhaust temperature is above a first threshold; and responsive to increased soot generation or increased soot storage, reducing the filter bypass flow and terminating deceleration fuel shut-off operation after a threshold duration due to exhaust temperature being above the first threshold. In some examples, the threshold duration may be based on one or more of the amount of soot generation, the amount of and soot storage, and the exhaust temperature relative to respective thresholds. When the filter bypass flow is increased, the engine may be operated in DFSO for a first duration based on an operator-demanded torque rather than a second duration based on a temperature of the particulate filter.

In this way, under operating conditions when the particulate matter load in exhaust gas is lower, a portion of exhaust may bypass the particulate filter, reducing exhaust back pressure and thereby improving fuel economy. Furthermore, by not flowing exhaust gas through the particulate filter during all driving conditions, soot and ash accumulation in the particulate filter may be reduced, thereby increasing the life of the particulate filter. Additionally, by allowing exhaust gas to bypass the particulate filter, the likelihood of excessive exotherms across the particulate filter during DFSO mode is reduced, and DFSO may be performed without regard for the temperature of the particulate filter. When particulate filter regeneration is desired, or when the exhaust gas contains an increased amount of soot, flow through the bypass may be decreased by decreasing an opening of a bypass valve disposed in the bypass. If the particulate filter is at an elevated temperature when DFSO is initiated, engine operating parameters and/or the DFSO operation itself may be adjusted in order to control the flow of oxygen-laden exhaust gas through the particulate filter. By controlling concentration of oxygen in the exhaust entering the particulate filter, a temperature of the particulate filter may be maintained below an upper threshold (e.g., a maximum allowed particulate filter temperature to reduce filter degradation) and thus, particulate filter degradation may be decreased while still performing regeneration and DFSO. As a result, the filter may not exceed the maximum allowed particulate filter temperature, thereby reducing the likelihood of a particulate filter degradation.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
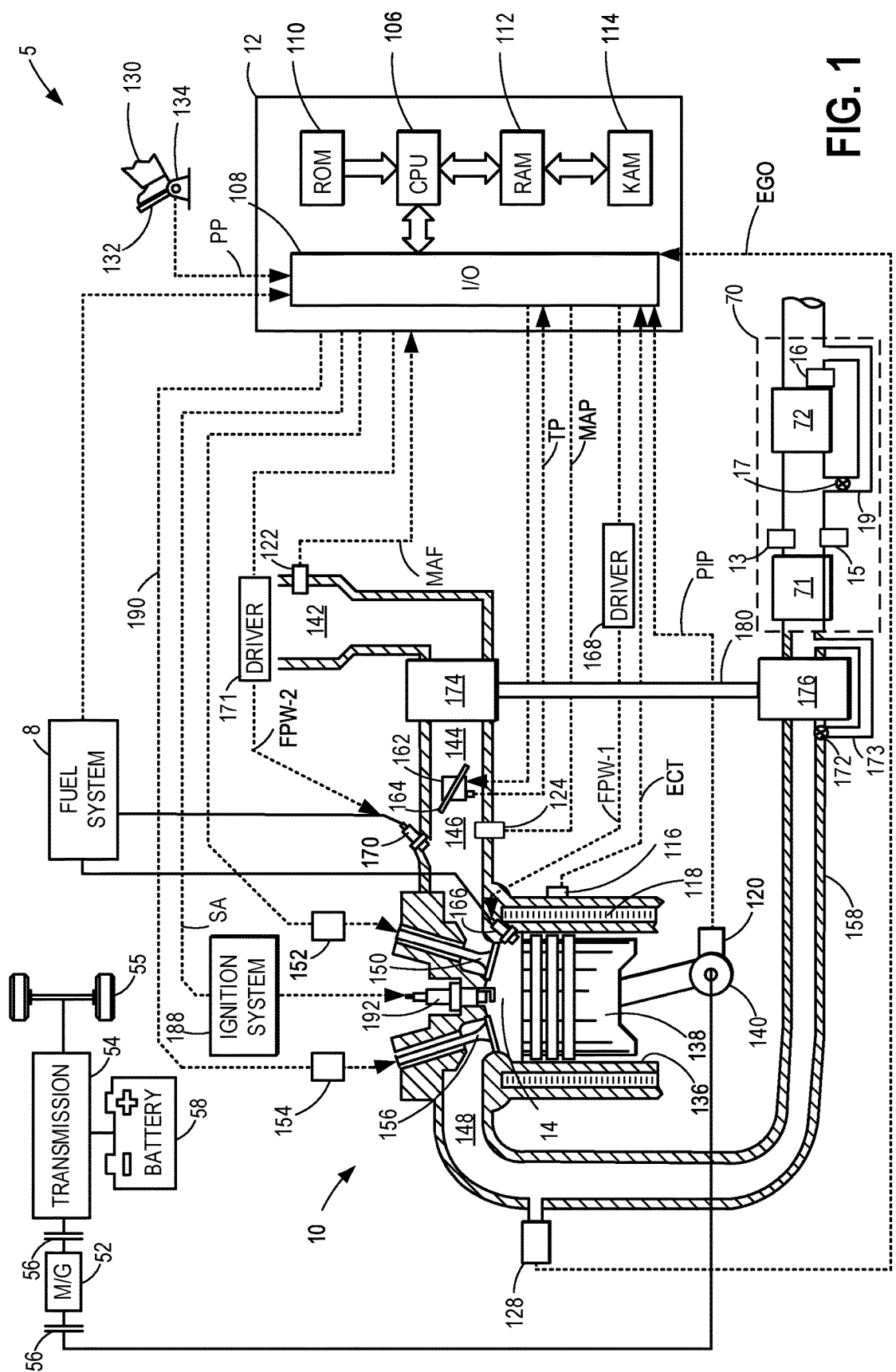
FIG. 1 shows a schematic diagram of a vehicle system with an emission control device that includes a particulate filter with a bypass.
Figure 2:
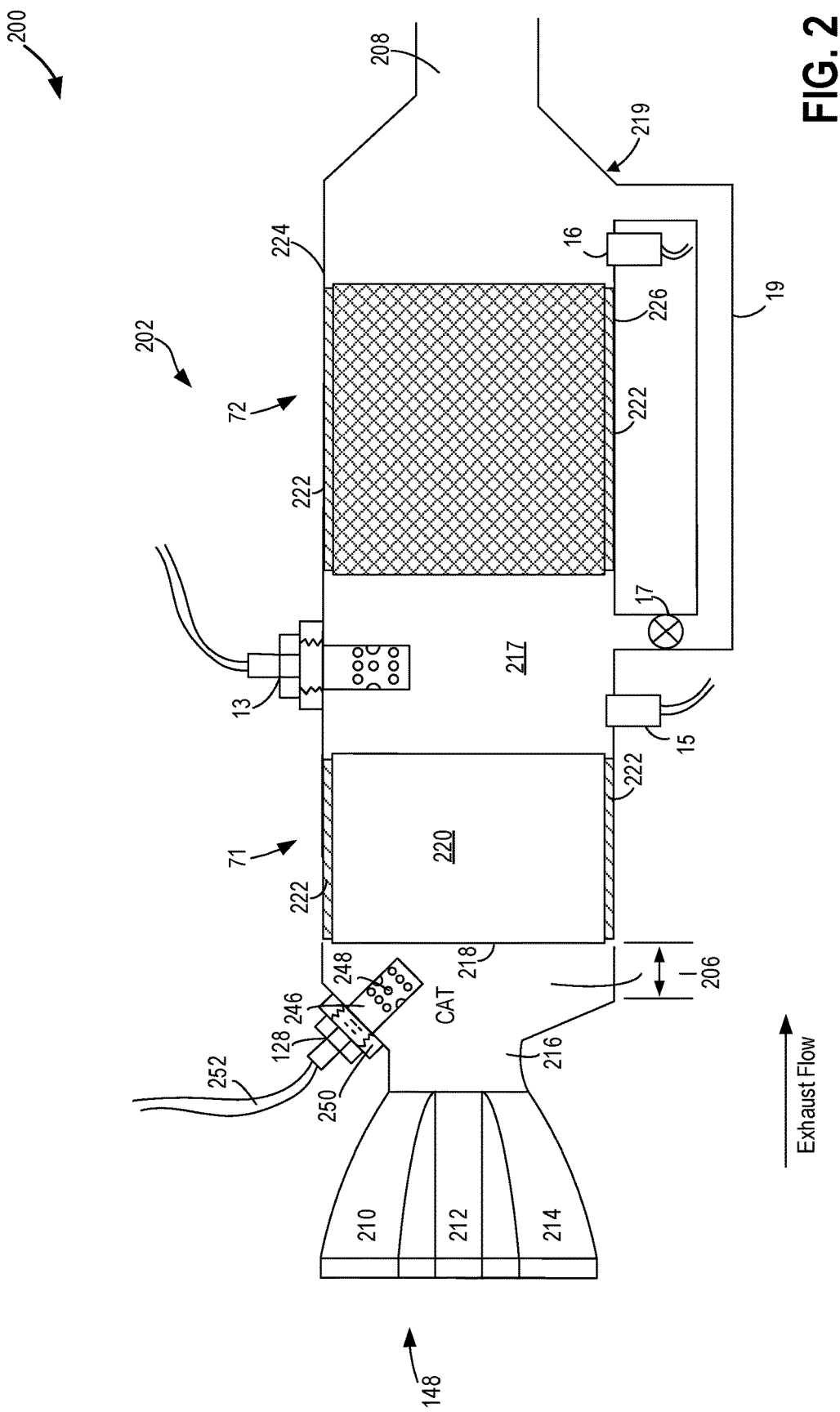
FIG. 2 shows a schematic diagram of the emission control device, such as the emission control device of FIG. 1.
Figure 3:
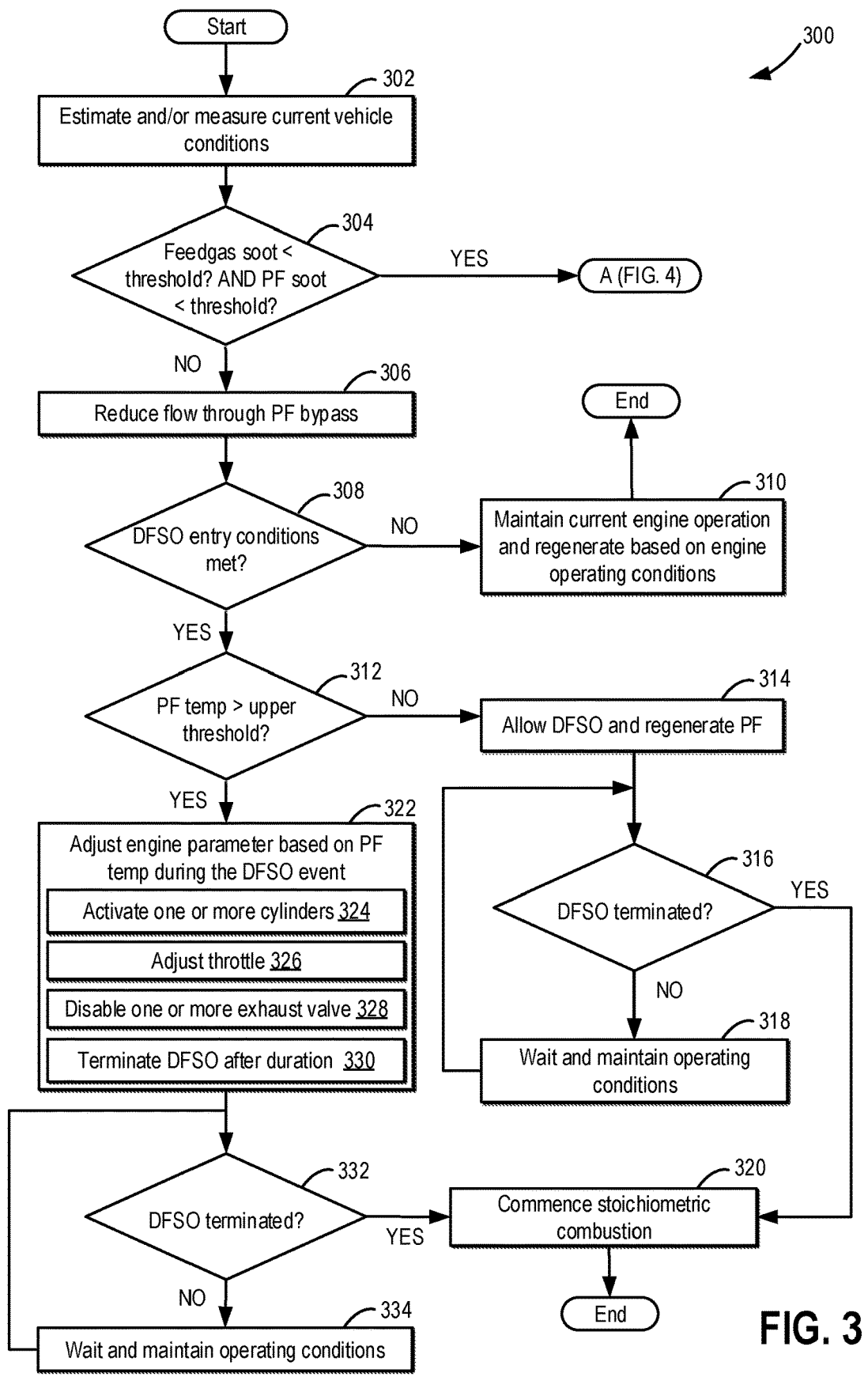
FIG. 3 shows a flow chart illustrating an example method for controlling flow through a bypass of an emission control device for a vehicle and adjusting deceleration fuel shut off (DFSO) operation based on flow through the bypass and a temperature of the emission control device.
Figure 4:
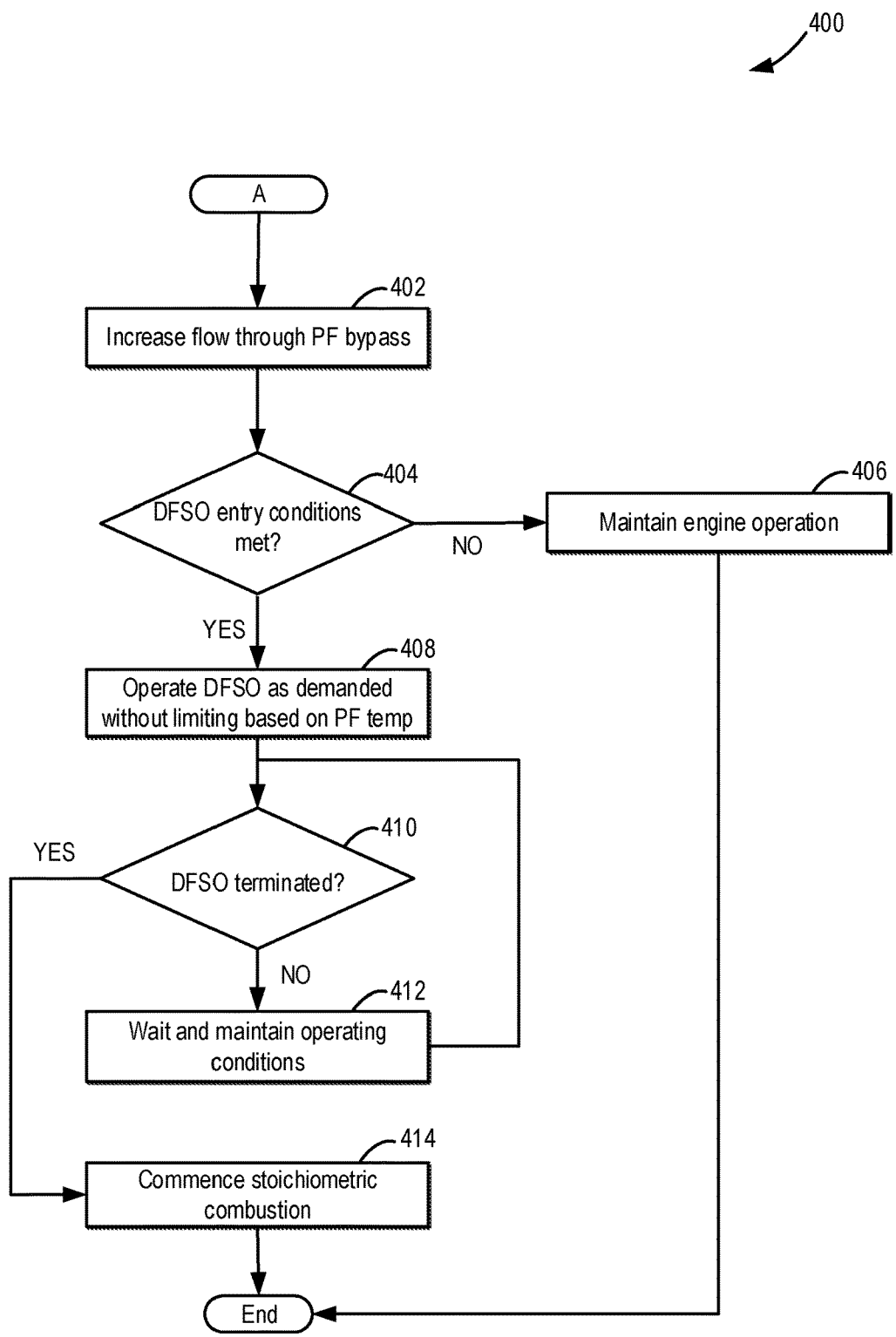
FIG. 4 shows a flow chart illustrating an example method for performing a DFSO after increasing flow through the bypass of the emission control device.
Figure 5:
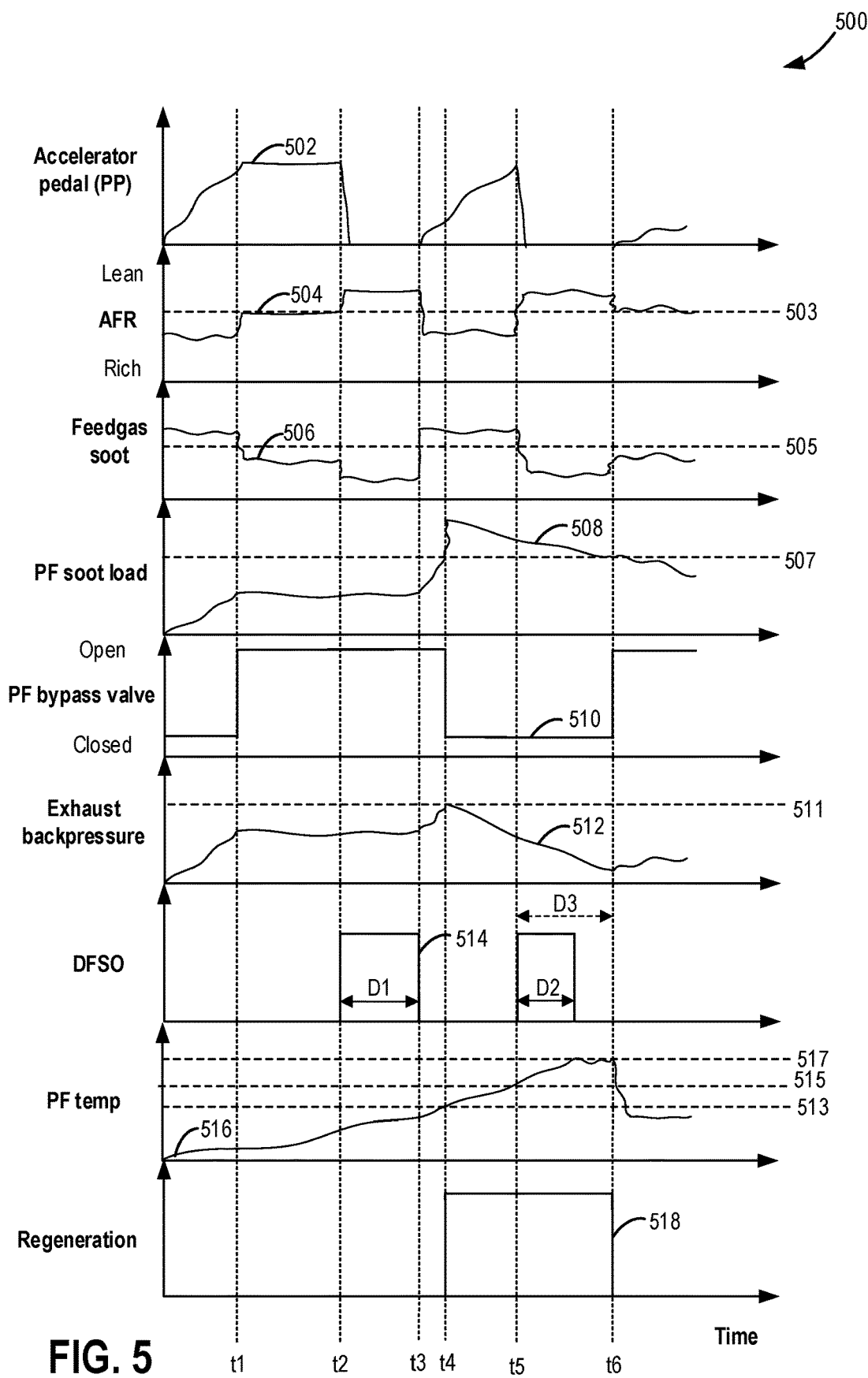
FIG. 5 shows a prophetic operation of an engine including controlling flowing through a bypass around an emission control device and adjusting DFSO operation responsive to the flow through the bypass and a temperature of the emission control device.

The following description relates to systems and methods for controlling flow through and a temperature of an emission control device of a vehicle engine, such as the vehicle engine of FIG. 1 that includes an exhaust system with an emission control device and a bypass around a portion of the emission control device, as shown in FIG. 2. In the depicted example, the emission control device includes a catalyst and particulate filter that may capture soot (e.g., particulate matter) from an exhaust gas of the engine, and the bypass comprises a bypass passage disposed around the particulate filter and a bypass valve disposed within the bypass passage. Adjusting a position of the bypass valve may control an amount of exhaust gas bypassing the particulate filter and may be based on a soot load of the exhaust gas entering the particulate filter, and the soot load of the particulate filter, as shown by the method presented at FIG. 3. When the amount of exhaust gas flowing through the particulate filter bypass passage is reduced, and deceleration fuel shut-off (DFSO) conditions are met, the particulate filter may be regenerated during the DFSO. However, when the temperature of the particulate filter is above a threshold, DFSO operation may be adjusted to maintain the exhaust gases closer to stoichiometry and/or maintain the temperature of the particulate filter below an upper threshold level above which particulate filter degradation may occur, as shown in FIG. 3. When an increased amount of exhaust gas bypasses the particulate filter, and DFSO entry conditions are met, DFSO may be carried out without regard for the temperature of the particulate filter, as shown in FIG. 4. In this way, a controller may adjust engine parameters during engine operation, including the position of the particulate filter bypass valve and engine operating parameters controlling DFSO, based on an exhaust gas and/or particulate filter soot load and a temperature of the particulate filter, as shown in FIG. 5. By controlling flow through a bypass around a particulate filter based on engine exhaust and particulate filter soot levels and by controlling DFSO based on the bypass flow and particulate filter temperature, the engine may be operated in DFSO to increase fuel economy while also reducing particulate filter degradation during DFSO and increasing an overall longevity of the particulate filter.

Turning now to FIG. 1, it schematically illustrates one cylinder of multi-cylinder engine 10, which may be included in a propulsion system of a vehicle system 5. In some examples, vehicle system 5 may be a hybrid vehicle with multiple sources of torque available to one or more vehicle wheels 55. In other examples, vehicle system 5 is a conventional vehicle with only an engine, or an electric vehicle with only electric machine(s). In the example shown, vehicle system 5 includes engine 10 and an electric machine 52. Electric machine 52 may be a motor or a motor/generator. Crankshaft 140 of engine 10 and electric machine 52 are connected via a transmission 54 to vehicle wheels 55 when one or more clutches 56 are engaged. In the depicted example, a first clutch 56 is provided between crankshaft 140 and electric machine 52, and a second clutch 56 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 58 to provide torque to vehicle wheels 55. Electric machine 52 may also be operated as a generator to provide electrical power to charge battery 58, for example during a braking operation.

Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Combustion chamber (e.g., cylinder) 14 of engine 10 may include combustion chamber walls 136 with piston 138 positioned therein. In some embodiments, the face of piston 138 inside cylinder 14 may have a bowl. Piston 138 may be coupled to crankshaft 140 so that reciprocating motion of the piston is translated into rotational motion of the crankshaft. Crankshaft 140 may be coupled to at least one drive wheel of a vehicle via an intermediate transmission system. Further, a starter motor (not shown) may be coupled to crankshaft 140 via a flywheel to enable a starting operation of engine 10.

Combustion chamber 14 may receive intake air from intake manifold 146 via intake passages 142 and 144, and may exhaust combustion gases via exhaust manifold 148. In this way, intake passages 142 and 144 are fluidically coupled to intake manifold 146. Intake manifold 146 and exhaust manifold 148 can selectively communicate with combustion chamber 14 via a respective intake valve 150 and exhaust valve 156. In some embodiments, combustion chamber 14 may include two or more intake valves and/or two or more exhaust valves.

Intake valve 150 and exhaust valve 156 may be controlled by controller 12 via respective electric variable valve actuators 152 and 154. Alternatively, the variable valve actuators 152 and 154 may be electro hydraulic or any other conceivable mechanism to enable valve actuation. During some conditions, controller 12 may vary the signals provided to the variable valve actuators to control the opening and closing of the respective intake and exhaust valves. The position of intake valve 150 and exhaust valve 156 may be determined by respective valve position sensors (not shown). In alternative embodiments, one or more of the intake and exhaust valves may be actuated by one or more cams, and may utilize one or more of cam profile switching (CPS), variable cam timing (VCT), variable valve timing (VVT) and/or variable valve lift (VVL) systems to vary valve operation. For example, cylinder 14 may alternatively include an intake valve controlled via electric valve actuation and an exhaust valve controlled via cam actuation including CPS and/or VCT.

Fuel injector 166 is shown coupled directly to combustion chamber 14 for injecting fuel directly therein in proportion to the pulse width of signal FPW-1 received from controller 12 via electronic driver 168. In this manner, fuel injector 166 provides what is known as direct injection of fuel into combustion chamber 14. It will be appreciated that the fuel injector may be mounted in the side of the combustion chamber or in the top of the combustion chamber, for example.

Fuel injector 170 is shown coupled directly to intake manifold 146 for injecting fuel directly therein in proportion to the pulse width of signal FPW-2 received from controller 12 via electronic driver 171. In this manner, fuel injector 170 provides what is known as port injection of fuel into intake manifold 146. Fuel may be delivered to fuel injector 166 and 170 by a fuel system 8 that may include a fuel tank, a fuel pump, and a fuel rail. It will be appreciated that engine 10 may include one or more of port fuel injection and direct injection.

As previously mentioned, some engine embodiments may include operating the engine in deceleration fuel shut-off (DFSO) mode to increase fuel economy and reduce brake wear. When the engine is operated in DFSO mode, the engine is operated without fuel injection while the engine rotates and pumps air through the cylinders. Specifically, fuel injection via fuel injector 166 and/or fuel injector 170 to one or more cylinders 14 is disabled while intake air may continue to be pumped through the cylinders from the intake to the exhaust, via the operating intake and exhaust valves.

DFSO entry conditions may be based on a plurality of vehicle and engine operating conditions. In particular, a combination of one or more of vehicle speed, vehicle acceleration, engine speed, engine load, throttle position, pedal position, transmission gear position, and various other parameters may be used to determine whether the engine will be entering DFSO. In one example, DFSO entry conditions may be met when the vehicle is decelerating (e.g., vehicle speed is decreasing). In another example, the DFSO entry conditions may be based on an engine speed below a threshold. In yet another example, the DFSO entry conditions may be based on an engine load below a threshold and/or decreasing engine load. In still another example, the DFSO condition may be based on an accelerator pedal position that indicates no torque is being requested. For example, during a tip-out where an operator releases the accelerator pedal (e.g., input device 132), DFSO entry conditions may be met and DFSO may be requested. Additionally or alternatively, entry into DFSO may be determined based on a commanded signal to cease fuel injection.

Ignition system 188 can provide an ignition spark to combustion chamber 14 via spark plug 192 in response to spark advance signal SA from controller 12, under select operating modes. Though spark ignition components are shown, in some embodiments, combustion chamber 14 or one or more other combustion chambers of engine 10 may be operated in a compression ignition mode, with or without an ignition spark.

Intake passage 144 or intake manifold 146 may include a throttle 162 having a throttle plate 164. In this particular example, the position of throttle plate 164, or a throttle opening, may be varied by controller 12 via a signal provided to an electric motor or actuator included with throttle 162, a configuration that is commonly referred to as electronic throttle control (ETC). In this manner, throttle 162 may be operated to vary the intake air provided to combustion chamber 14 among other engine cylinders. The position of throttle plate 164 may be provided to controller 12 by throttle position signal TP. Intake passage 142 may include a mass airflow sensor 122 and a manifold air pressure sensor 124 for providing respective signals MAF and MAP to controller 12.

Engine 10 may further include a compression device such as a turbocharger or supercharger including at least a compressor 174 arranged along intake passage 144. For a turbocharger, compressor 174 may be at least partially driven by a turbine 176 (e.g., via a shaft 180) arranged along an exhaust passage 158. For a supercharger, compressor 174 may be at least partially driven by the engine 10 and/or an electric machine, and may not include a turbine. Thus, the amount of compression provided to one or more cylinders of the engine via a turbocharger or supercharger may be varied by controller 12.

In some embodiments, engine 10 may include an exhaust gas recirculation (EGR) system that includes a low pressure (LP) EGR and/or high pressure (HP) EGR passage for recirculating exhaust gas (not shown). One example of an EGR system includes a low pressure EGR system, where EGR may be routed from downstream of turbine 176 of a turbocharger to upstream of a compressor 174 of the turbocharger. In a high pressure (HP) EGR system, EGR may be routed from upstream of the turbine 176 of the turbocharger to downstream of the compressor 174 passage of the turbocharger. In both the LP and HP EGR systems, the amount of EGR provided to intake manifold 146 may be varied by controller 12 via a respective LP EGR valve and HP EGR valve (not shown). Further, an EGR sensor (not shown) may be arranged within the respective LP EGR passage and/or HP EGR passage, and may provide an indication of one or more of pressure, temperature, and concentration of the exhaust gas. Alternatively, the EGR flow may be controlled through a calculated value based on signals from the MAF sensor (upstream), MAP (intake manifold), MAT (manifold gas temperature) and the crank speed sensor. Further, the EGR flow may be controlled based on an exhaust O2 sensor and/or an intake oxygen sensor (not shown). Under some conditions, the EGR system may be used to regulate the temperature of the air and fuel mixture within the combustion chamber and/or the temperature proximate to a particulate filter 72.

It will be appreciated that in several embodiments, exhaust passage 158 may include a bypass passage 173 positioned upstream of the turbine 176. A flow control valve, known as a wastegate valve 172, may be included between the exhaust passage 158 and the bypass passage. Depending on position of the wastegate valve 172, the amount of exhaust gas passing turbine 176 may be controlled. Position of the wastegate valve may be controlled via a wastegate actuator (not shown, and which may be hydraulic, pneumatic, electric, or mechanical in nature) responding to a signal from controller 12. For example, the controller 12 may want to increase torque, and may accomplish this by increasing boost pressure. One way to increase boost pressure is to increase the amount of energy going to turbine 176. For more energy to turbine 176, the controller may signal the wastegate actuator to change wastegate valve to a first position, or maintain a first position, (e.g., fully closed) that is such that no exhaust may travel through the bypass passage 173 and all exhaust gas passes through turbine 176. Conversely, to decrease boost pressure, the controller 12 may signal the wastegate actuator to cause the wastegate valve to assume, or maintain, a second position (e.g., fully open) to allow a percentage of exhaust gas traveling from exhaust passage 158 to flow past the wastegate valve, through bypass passage, thereby bypassing turbine 176, until the bypass passage reconnects to exhaust passage 158 downstream of turbine 176. It will be appreciated that wastegate valve may assume a plurality of intermediate positions (in response to controller 12 signaling the wastegate actuator to change position of the wastegate valve) residing between the first (e.g., fully closed) and second (e.g., fully open) positions, so that variable amounts of exhaust gas may travel through the bypass passage, thereby bypassing turbine 176.

Similarly, it will be appreciated that compressor 174 may include a recirculation passage (not shown) across the compressor. The recirculation passage may be used for recirculating (warm) compressed air from the compressor outlet back to the compressor inlet. In some embodiments, the compressor recirculation system may alternatively, or additionally, include a recirculation passage for recirculating (cooled) compressed air from the compressor outlet, downstream of a charge air cooler (not shown) to the compressor inlet or compressor bypass for dissipating compressed air to atmosphere. A flow control valve, known as a compression recirculation valve (not shown), may be included between the intake passage 142 and the recirculation passage. Depending on position of the wastegate valve, the amount of recirculating intake air may be controlled. A position of the compression recirculation valve (CRV) may be controlled via a CRV actuator (not shown, and which may be hydraulic, pneumatic, electric, or mechanical in nature) responding to a signal from controller 12. The CRV may be a continuously variable valve wherein a position of the valve is continuously variable from a fully closed position to a fully open position. In some embodiments, the compressor recirculation valve may be normally partially open during boosted engine operation to provide some surge margin. Herein, the partially open position may be a default valve position. Increasing the opening of the compressor recirculation valve may include actuating (or energizing) a solenoid of the valve.

Emission control device (ECD) 70 is shown arranged along exhaust passage 158 downstream of exhaust manifold 148 and downstream of exhaust gas sensor 128. Exhaust gas sensor 128 is shown coupled to exhaust passage 158 upstream of emission control device (ECD) 70. Exhaust gas sensor 128 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor.

In this example, ECD 70 includes a catalyst, which may be a three way catalytic converter (TWC) 71, particulate filter (PF) 72, a catalyst monitor sensor 13, a pressure sensor 15, and a temperature sensor 16. It will be appreciated that one or more of the sensors shown in FIG. 1 may be omitted and/or repositioned. In some embodiments, PF 72 may include one or more catalyst materials in addition to components configured to filter exhaust gas. For example, PF 72 may be coated with a wash-coat including one or more catalyst materials. Such a configuration may be employed for embodiments in which engine 10 is spark-ignited, for example. In some embodiments, the TWC 71 and PF 72 may be separate components comprising separate housings positioned away from one another (e.g., the TWC being upstream of the PF as shown). A bypass passage 19 may be coupled to the exhaust passage 158 directly upstream and downstream of the PF 72 and thus be disposed around the PF 72. An exhaust control valve (e.g., bypass valve) 17 is positioned within the bypass passage 19. Details regarding exemplary ECDs are provided below with reference to FIG. 2. It will be understood, however, that ECD 70 is provided as a non-limiting example and that, in other embodiments, the ECD may include other components in addition to or in lieu of TWC 71 and/or PF 72, including but not limited to a lean NOx trap, an SCR catalyst, an oxidation catalyst, or an alternative gas treatment device. For example, in some embodiments, an alternate catalyst or exhaust aftertreatment device may be positioned upstream of the PF 72, in place of the TWC 71.

The catalyst monitor sensor 13 may be a HEGO (heated EGO) sensor, but it will be appreciated that another suitable type of exhaust gas sensor may be used to monitor the catalyst. Pressure sensor 15 may be positioned upstream of the PF 72. In this way, the output of pressure sensor 15 may provide an indication to the vehicle controller 12 of a level of exhaust backpressure from the PF 72, which may be a further indication of a soot load on the filter. For example, if the PF 72 has a higher soot load, there may exist an increased backpressure upstream of the PF 72. Temperature sensor 16 may be positioned downstream of the PF 72 in order to monitor a temperature of the particulate filter. Specifically, output from the temperature sensor 16 may provide an indication of exhaust temperature to the controller 12. In some examples, the exhaust temperature may be the temperature proximate the outlet of the PF 72, or it may be the temperature of the particulate filter itself. It will be appreciated that a temperature sensor may additionally or optionally be placed upstream of the particulate filter in order to monitor a temperature gradient of an exothermic reaction occurring in the particulate filter during a regeneration, for example. In yet another example, temperature sensor 16 may be positioned within the PF 72.

Controller 12 is shown in FIG. 1 as a microcomputer, including microprocessor 106, input/output ports 108, an electronic storage medium (e.g., computer-readable) for executable programs and calibration values shown as read-only memory 110 in this particular example, random access memory 112, keep alive memory 114, and a data bus. Storage medium read-only memory 110 can be programmed with computer readable data representing instructions executable by microprocessor 102 for performing the methods described herein, as well as other variants that are anticipated but not specifically listed. As described above, FIG. 1 shows one cylinder of a multi-cylinder engine, and it will be appreciated that each cylinder may similarly include its own set of intake/exhaust valves, fuel injector, spark plug, etc.

Controller 12 may receive various signals from sensors coupled to engine 10, in addition to those signals previously discussed, including measurement of the temperature of exhaust gases and/or PF 72 from temperature sensor 16, measurement of a pressure (e.g., exhaust backpressure) proximate the inlet of the PF 72 from pressure sensor 15, a degree of operator-demanded torque from pedal position sensor 134, and a condition of the TWC 71 from catalyst monitor sensor 13. Controller 12 may also receive signals including measurement of inducted mass airflow (MAF) from mass airflow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP), or throttle opening, from a throttle position sensor; and absolute manifold pressure signal, MAP, from pressure sensor 124. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, Hall effect sensor 120, which is also used as an engine speed sensor, may produce a predetermined number of equally spaced pulses each and every revolution of the crankshaft. The controller 12 receives signals from the various sensors of FIG. 1 (e.g., catalyst monitor sensor 13, pressure sensor 15, temperature sensor 16, pedal position sensor 134, etc.) and employs the various actuators (e.g., a valve actuator of bypass valve 17, throttle plate 164, spark plug 192, etc.) of FIG. 1 to adjust engine operation based on the received signals and instructions stored on a memory of the controller.

In one example, the controller may reference a feedgas soot model (stored in a memory of the controller and according to instructions stored on the memory) in order to estimate the amount of soot entrained in exhaust gas exiting cylinders of the engine and entering the particulate filter. The feedgas soot model may use a plurality of sensor inputs in order to estimate the entrained soot. In one example, the output of engine coolant temperature sensor 116 may provide an indication of engine temperature and the output of exhaust gas sensor 128 may provide an indication of an air-fuel ratio. Based on these sensor inputs, the feedgas soot model may be used by the controller to estimate an amount of soot entrained in exhaust gas. For example, the controller may determine a decreased amount of soot is entrained in the exhaust gas when the engine is operating near a stoichiometric air-fuel ratio, and the engine coolant temperature is above a "warm engine" threshold temperature. Responsive to data from the feedgas soot model, the controller may determine that the feedgas soot levels (e.g., soot levels in the exhaust gas) are below a first soot threshold and thus, an increased amount of exhaust gases can bypass the particulate filter. Additionally, the controller may receive sensor output from pressure sensor 15 proximate the inlet of the particulate filter, indicating that a low exhaust backpressure exists upstream of the particulate filter. The controller may correlate the low exhaust backpressure with a low soot storage load in the particulate filter (e.g., particulate filter soot load less than a second soot threshold). Responsive to both the feedgas soot load being below the first soot threshold and the particulate filter soot load being below the second soot threshold, the controller may send a command signal to the actuator of the particulate filter bypass valve 17 in order to increase the opening of the bypass valve 17. As a result, an increased amount of exhaust gas may flow through the bypass passage 19 around the particulate filter 72. In this way, a greater portion of the exhaust gas from the engine may bypass the particulate filter, and a reduced portion of the exhaust gas may pass through the particulate filter. It will be appreciated that particulate filter bypass valve 17 may be adjustable via controller 12 to a plurality of positions (e.g., a plurality of positions between fully open and fully closed and including the fully open and fully closed positions). Alternatively, when the controller determines, based on sensor signals and the stored soot model(s), that the exhaust gases have increased soot levels (above the first soot threshold) and/or the particulate filter soot level is increased (above the second soot threshold), the controller may send a signal to the actuator of the bypass valve 17 in order to decrease the amount of opening of the bypass valve 17 and thus decrease the amount of exhaust gas flowing through the bypass passage 19 and increase the amount of exhaust gas flowing through the particulate filter.

Further, responsive to an indication of the increased quantity of exhaust gas bypassing the particulate filter 72, via bypass passage 19, the controller may not conclude a duration of a DFSO event based on a temperature of the particulate filter, as may be indicated by temperature sensor 16. In this way, the engine may be operated in DFSO mode for an increased duration that is based on an operator-demanded torque demand (e.g., torque demanded by an operator of the vehicle, as indicated by an accelerator pedal position), thereby improving fuel economy, rather than being terminated prematurely (e.g., before engine speed, engine load, and an accelerator position would otherwise end DFSO operation). Additionally, by not flowing exhaust gas through the particulate filter during all operating conditions, fuel economy may increase during those conditions due to reduced exhaust backpressure, and the life of the particulate filter may be extended.

Turning now to FIG. 2, an example vehicle exhaust system 200 including an emission control device (ECD) 202 is shown. In some examples, ECD 202 may be ECD 70 of FIG. 1. As such, ECD 202 may include identical or similar components to ECD 70 of FIG. 1, and components will be numbered similarly. Exhaust system 200 includes exhaust manifold 148 with a plurality of exhaust runners or passages from which exhaust gas from engine cylinders (e.g., cylinder 14 of FIG. 1) flows. The exhaust runners are coupled to a collection region 206 upstream of ECD 202. In this way, ECD 202 is configured to receive exhaust gases from an engine, such as engine 10 of FIG. 1.

Exhaust manifold 148 may include runners 210, 212, and 214 that converge to form a short, narrow exhaust runner convergence conduit 216. Convergence conduit 216 may be identical or similar to exhaust passage 158 of FIG. 1. Runners 210, 212, and 214 may have equal or unequal lengths and widths, where the length of a runner may be considered as the measurement along a central axis of the runner from exhaust manifold 148 to the center of an exhaust runner convergence conduit 216, and the width of a runner may be considered as the diameter of the runner at any given cross-section perpendicular to the central axis of that runner.

In the example depicted in FIG. 2, ECD 202 includes catalyst 71 positioned upstream of particulate filter 72. Catalyst 71 may include a catalyst canister 218 positioned within an ECD body 219. Catalyst canister 218 is particularly positioned proximate and downstream of exhaust runner convergence conduit 216 and upstream of a particulate filter described below. Catalyst canister 218 may include a catalyst brick 220 interposed between mounting mats 222 positioned between the catalyst brick and an upper wall 224 of ECD body 219 and between the catalyst brick and a lower wall 226 of the ECD body. As shown in FIG. 2, catalyst brick 220 is positioned in close proximity to exhaust manifold 148. Such a closely-coupled configuration may encourage the temperature of catalyst brick 220 to rise quickly to its light-off temperature. Upon reaching this light-off temperature, exhaust gas species in exhaust gas may be effectively converted to desirable inert gases.

It will be appreciated that ECD 202 is provided as a non-limiting example and that numerous additions and modifications to the ECD may be made without departing from the scope of this disclosure. For example, in other embodiments ECD 202 may include two or more catalyst bricks. In this example, one or more of the multiple catalyst bricks may include two or more different cell densities. The variation in cell densities among the multiple catalyst bricks may be the same or may differ between at least two of the catalyst bricks. Further, the average cell density among the multiple catalyst bricks may be the same or may differ between at least two of the catalyst bricks. Other features may or may not be shared among the multiple catalyst bricks, including but not limited to length, catalyst brick substrate materials, catalyst materials, and oxygen storage materials, if included.

ECD 202 further includes exhaust gas sensor 128 positioned at an upper region of the ECD proximate exhaust runner convergence conduit 216. Exhaust gas sensor 128 may be, but is not limited to, a linear oxygen sensor or universal or wide-range exhaust gas oxygen (UEGO), two-state oxygen sensor (EGO), heated EGO (HEGO), NOx, HC, or CO sensor. In the example depicted in FIG. 2, exhaust gas sensor 128 includes internal electrodes (not shown) encased within a metal shield 246. Exhaust gas flow originating from exhaust runners 210, 212, and 214 flows through exhaust runner convergence conduit 216 and is detected by the electrodes of exhaust gas sensor 128. The exhaust flow is detected by the electrodes after flowing into metal shield 246 via openings 248 arranged longitudinally along the bottom of the metal shield 246. A sensor housing 250 situates exhaust gas sensor 128 within ECD body 219 and couples the electrodes to a control system (e.g., controller 12 of FIG. 1) by wires 252. Readings from exhaust gas sensor 128 may be used to control operational aspects of ECD 202 as described below.

ECD 202 also includes a catalyst monitor sensor 13, which may be configured similarly to exhaust gas sensor 128. As shown in FIG. 2, catalyst monitor sensor 13 is positioned downstream of catalyst 71. As described in further detail below, readings from both exhaust gas sensors 128 and 13 may be used to control operational aspects of ECD 202. For example, a difference between the readings from each sensor may indicate an amount of oxygen stored in catalyst 71. It will be appreciated that the relative positioning of exhaust gas sensor 128 and catalyst 71 is non-limiting and that the sensor and/or catalyst may be placed elsewhere. In other embodiments three or more exhaust sensors may be included in ECD 202—for example, a third exhaust sensor positioned downstream of a particulate filter described below, in addition to exhaust gas sensors 128 and 13.

The embodiment of FIG. 2 also includes a pressure sensor 15 configured to measure the pressure of exhaust gases flowing through the ECD. As shown therein, pressure sensor 15 is positioned along lower wall 226 and interposed between catalyst 71 and a particulate filter described below. It will be appreciated that this positioning is non-limiting and that pressure sensor 15 may be located elsewhere in ECD 202. For example, one or more pressure sensors may be positioned upstream of catalyst brick 220 or downstream of the particulate filter. In other embodiments, pressure sensor 15 may be omitted from ECD 202, with exhaust pressure being inferred based on one or more engine operating parameters.

The embodiment of FIG. 2 also includes a temperature sensor 16 configured to measure the temperature of exhaust gases flowing through the ECD. As shown therein, temperature sensor 16 is positioned along lower wall 226 and after (directly downstream from) a particulate filter described below. It will be appreciated that this positioning is non-limiting and that a temperature sensor 16 may be located elsewhere in ECD 202. For example, one or more temperature sensors 16 may be positioned upstream of catalyst brick 220 or upstream of the particulate filter in order to measure a temperature gradient across the particulate filter. In this way, the exotherm across the particulate filter may be characterized and monitored, such as during a filter regeneration process. Alternately, temperature sensor 16 may be omitted from ECD 202, with exhaust temperature being inferred based on one or more engine operating parameters.

ECD 202 further includes particulate filter (PF) 72 positioned downstream of catalyst 71 with the ECD body 219. PF 72 may be interposed between mounting mats 222 positioned between the particulate filter and the upper wall 224 and between the particulate filter and the lower wall 226 of the ECD body. PF 72 may be configured to trap particulate matter such as soot mixed with exhaust gas flowing through the particulate filter 72. As soot and/or other particulate matter accumulates in PF 72, backpressure in the particulate filter may build up, which can interfere with engine operation and reduce fuel economy. As such, PF 72 may be periodically regenerated and soot stored therein burned, for example responsive to a soot level stored in the filter exceeding a threshold soot level. For embodiments in which ECD 202 is used in conjunction with a spark-ignition engine, and PF 72 is a gasoline particulate filter, and exhaust gas from the spark-ignition engine may be sufficiently hot to combust soot stored in the filter. However, in some instances, the spark-ignition engine may be predominantly operated under stoichiometric conditions, in which case a sufficient amount of gaseous oxygen may not be available for combusting the soot stored in PF 72, and an active regeneration may be initiated. It will be appreciated that the embodiments of PF 72 may include any type of particulate filter including, but not limited to, a gasoline particulate filter (GPF) or a diesel particulate filter (DPF).

ECD 202 includes a bypass valve 17 disposed in a bypass passage 19 coupled around the particulate filter 72, where the filter bypass flow (e.g., exhaust gas) only bypasses the particulate filter 72 and not additional emission control devices or the catalyst 71 positioned upstream of the particulate filter 72. In this way, bypass passage 19 may be coupled to exhaust passage 217 directly upstream and downstream of PF 72. In one example, responsive to a request to increase the amount of gasoline combustion exhaust gases bypassing the particulate filter 72, controller 12 (of FIG. 1) may send a control signal to the actuator of bypass valve 17 in order to increase the opening of the valve such that an increased flow of combustion exhaust gas may enter the bypass passage 19. In this way, the amount of flow of combustion exhaust gas through the particulate filter 72 may decrease as a greater proportion of the total amount of combustion exhaust gas travels through the bypass passage 19 and around particulate filter 72. Conversely, reducing the flow of exhaust gas through the particulate filter bypass passage 19 may include the controller sending a control signal to the actuator of the bypass valve 17 in order to decrease the amount of opening of the bypass valve 17, which would cause an increase of flow of combustion exhaust gas through the particulate filter 72. After exhaust gas passes through the particulate filter 72 or bypass passage 19, the exhaust gas continue through exhaust passage 208 toward atmosphere, or to further exhaust treatment downstream.

In this way, during a variety of engine operating conditions that may generate exhaust with a decreased particulate matter load, exhaust gas may bypass the particulate filter and reduce exhaust backpressure, increasing fuel economy. Further, DFSO may not be limited, prematurely terminated, or avoided all together in order to avoid exceeding particulate filter temperature thresholds during particulate filter regeneration when the bypass passage around the particulate filter is open, thereby increasing the amount of time the engine may operate in DFSO mode.

It will be appreciated that various aspects of vehicle exhaust system 200 and ECD 202 may be modified without departing from the scope of this disclosure. For example, the relative positioning, geometries, and dimensions (e.g., length, width, height) of various components of system 200 (e.g., catalyst 71, PF 72, exhaust gas sensor 128, catalyst monitor sensor 13, pressure sensor 15, and temperature sensor 16) may be adjusted. In some embodiments, two or more exhaust sensors, two or more pressure sensors, and/or two or more temperature sensors may be provided, while in other embodiments temperature sensor 16 may be omitted from system 200. In some embodiments, two or more ECDs may be provided in a cascaded fashion such that a first ECD (e.g., comprising a catalyst and/or a particulate filter) may be followed by a second ECD positioned downstream of the first ECD, where the second ECD may or may not include the same components as the first ECD. Further, ECD 202 may be modified to include, alternatively or in addition to catalyst 71 and/or PF 72, other emission control devices, such as a NOx trap, SCR catalyst, etc.

Turning now to FIG. 3, shows a flow chart illustrating an example method 300 for adjusting flow through a bypass passage (e.g., bypass passage 19 of FIGS. 1-2) disposed around a particulate filter (e.g., particulate filter 72 of FIGS. 1-2) of an emission control device (e.g., ECD 70 of FIG. 1, ECD 202 of FIG. 2) for a vehicle and adjusting deceleration fuel shut off (DFSO) operation based on flow through the bypass passage and a temperature of the emission control device. In one example, adjusting the flow through the bypass passage may include adjusting a position of a valve disposed within the bypass passage (e.g., exhaust bypass valve 17 shown in FIGS. 1-2). In one example, the method includes increasing the flow of exhaust gas through the exhaust bypass passage responsive to an exhaust gas soot load under a first threshold soot load and a soot load stored in the particulate filter under a second threshold soot load. In this way, when both of these conditions are satisfied, exhaust gas from the engine may bypass the particulate filter, reducing the exhaust backpressure across a wide range of driving conditions, and thereby increasing fuel economy. Further, when exhaust gases bypass the particulate filter while operating in a DFSO mode, DFSO operation may not be ended responsive to a temperature of the particulate filter because the exhaust gases with increased oxygen levels resulting from DFSO are bypassing the particulate filter. In this way, the risk of self-burn of the particulate filter is decreased under a plurality of driving conditions and DFSO may be controlled based on engine operating conditions (such as operator torque demand) to increase fuel economy, without limiting the duration of DFSO based on a temperature of the particulate filter. Additionally, as a result of bypassing the particulate filter when regeneration is not desired and exhaust emissions are below a threshold, soot and ash accumulation in the particulate filter may be reduced, extending the life of the particulate filter and exhaust system. Alternatively, the method may include decreasing the flow of exhaust gas through the exhaust bypass passage responsive to an exhaust gas soot load above a first threshold soot load or a soot load stored in the particulate filter above a second threshold soot load. In this way, when one of these conditions is satisfied, exhaust gas from the engine may pass through the particulate filter for the purpose of reducing particulate emissions from the engine and/or regenerating the particulate filter. When exhaust gases pass through the particulate filter while operating in a DFSO mode, engine parameters (including DFSO operation) may be adjusted responsive to a temperature of the particulate filter to reduce the likelihood of particulate filter degradation. In this way, the likelihood of self-burn of the particulate filter may be decreased by adjusting the amount of oxygen-laden exhaust gas passing through the filter and/or adjusting the air-fuel ratio of the engine toward stoichiometry.

In this way, a method for an engine, comprises: responsive to entry conditions for deceleration fuel shut-off (DFSO) operation being met: operating the engine in DFSO for a first duration based on an operator-demanded torque, in response to a bypass around a particulate filter disposed in an exhaust passage of the engine being open; and operating the engine in DFSO for a second duration based on a temperature of the particulate filter, in response to the bypass being closed and the temperature being above a first threshold. Additionally, the engine may be operated in DFSO for the first duration based on the operator-demanded torque when the bypass is closed and the temperature of the particulate filter is below the first threshold. In other words, if temperature of the particulate filter is not elevated to a temperature that increases a likelihood of degradation of the filter, DFSO may be performed based on operator-demanded torque, and not based on the temperature of the particulate filter.

Instructions for carrying out method 300 and the rest of the methods included herein may be executed by a controller (e.g., controller 12 of FIG. 1) based on instructions stored on a memory of the controller and in conjunction with signals received from sensors of the vehicle system (e.g., vehicle system 5 of FIG. 1), such as the sensors described above with reference to FIGS. 1-2. The controller may employ engine actuators of the engine system to adjust engine operation, according to the methods described below.

Method 300 starts at 302, where the routine includes estimating and/or measuring current vehicle conditions. Current vehicle conditions may include, but are not limited to, an air-fuel ratio (e.g., an air-fuel ratio of combusted exhaust gases exiting engine cylinders), a position of the particulate filter bypass valve (e.g., bypass valve 17 shown in FIGS. 1 and 2), a duration since the last particulate filter regeneration, an engine speed and engine load, an engine coolant temperature, a degree of actuation of (or position of) an accelerator pedal, and an exhaust temperature and pressure proximate the particulate filter. Current vehicle conditions may also include a current particulate filter soot load, which may be modeled based on the level of feedgas soot. The feedgas soot level may be modeled based on one or more of the engine coolant temperature, torque, the air-fuel ratio, and the engine speed.

In one example, a combustion air-fuel ratio may be indicated by the output of an exhaust gas sensor (e.g. exhaust gas sensor 128 or catalyst monitor sensor 13 of FIGS. 1-2). In this way, a controller (e.g., controller 12 of FIG. 1) may determine whether the engine is running leaner than stoichiometry (lambda greater than 1) or richer than stoichiometry (lambda less than 1). The controller may also determine the degree of opening of a particulate filter bypass valve (bypass valve 17 of FIGS. 1 and 2). In one example, the controller may monitor the duty cycle of the actuator of the bypass valve in order to estimate the degree of opening of the bypass valve. The controller may also record a duration elapsed since a previous regeneration of the particulate filter. In one example, this may include a timer that records an elapsed time since the previous instance the particulate filter reached regeneration temperature and maintained the regeneration temperature for a specified regeneration duration, as may be indicated by a temperature sensor (e.g. temperature sensor 16 of FIGS. 1 and 2) proximate the particulate filter. The controller may also receive indications of engine speed from a Hall effect sensor (e.g., Hall effect sensor 120 of FIG. 1), and engine load, which may be indicated by one or more of an engine speed, degree of actuation of an accelerator pedal (e.g., input device 132 of FIG. 1). The controller may receive an indication of engine temperature from an engine coolant temperature sensor (e.g., engine coolant temperature sensor 116 of FIG. 1). Engine temperatures above an engine temperature threshold may indicate that the engine is warm, and not in a cold start condition. The controller 12 may receive the output of a pressure sensor (e.g., pressure sensor 15 of FIGS. 1-2) at the particulate filter, which may indicate a degree of soot loading on the particulate filter that will be described further below. An empirical model may be used to estimate current particulate filter soot loading and may be used as a basis for controlling particulate filter regeneration. In one example, PF soot load modeling updates the PF soot load under varied operating conditions by adding a soot load estimated by a model (stored in memory of the controller), to the last measured soot load value. The soot model may include a level of engine feedgas soot, which may be determined primarily as a function of one or more of an engine speed, an engine coolant temperature, an air-fuel ratio, and torque. Controlling particulate filter regeneration may also be based on an alternative PF soot loading model. In some examples, controlling particulate filter regeneration may be based on a determined flow restriction that may be correlated to soot loading. In one example, flow restriction may be indicated by the output of a pressure sensor proximate the particulate filter. In one example, the pressure sensor may be positioned upstream of the particulate filter, as shown in FIG. 2.

It will be appreciated that feedgas soot, or exhaust gas soot, may be the amount of soot entrained in exhaust gas leaving the engine and entering the exhaust system. Ambient and other engine operating conditions may also be included as affecting feedgas soot. One example of typical operating conditions that may generate feedgas with soot levels below a first soot level threshold is when the engine coolant temperature is above a threshold engine temperature (e.g., when the engine is warm), when the air-fuel ratio is near a stoichiometric air-fuel ratio, and when the engine is not operating in compression injection mode. Conversely, one example of operating conditions that may generate feedgas with soot levels above the first soot level threshold is when the engine coolant temperature is below the threshold engine temperature (e.g., during a cold start), and/or when the air-fuel ratio is rich.

In one example, the PF soot model may estimate soot each and every 100 ms, whereas a slower calibratable timer determines the frequency at which soot estimated by the model is accumulated and added to measured soot load value. This timer may be executed when the engine is running and the PF, such as a gasoline particulate filter, is not in a regeneration mode. This timer can be calibrated to execute as slow as each and every 6 minutes, for example, and thus an additional accumulator may be used to capture soot generated during transient operating conditions. This transient accumulator may also be reset at the same frequency as the timer stated above, but with a delay. Soot from the soot model may be accumulated independently and added to last measured soot load value. When a measured soot load value is available, the accumulated soot load from model is cleared (e.g., set to zero).

Under certain engine operating conditions, the PF soot load may not be accurately determined based on a measured differential pressure across the PF. For example, the PF soot load measurement may not be sufficiently accurate at low exhaust volume flows due to degraded accuracy of the pressure sensors at a low exhaust flow condition. Additionally, the PF soot load may be inaccurate during transients, due to the higher time constants of the sensors and/or the unsteady fluid dynamics in the exhaust system. Therefore, during these conditions, the estimate of PF soot loading is independent from the soot load based on the measured differential pressure across the PF. Instead, a PF soot model is used to estimate the soot load based on engine speed and load, which is then corrected for engine/environmental operating conditions. The corrected PF soot model output is then added to the most recent measurement of soot load from the differential pressure that occurred under conditions outside those noted above.

At 304, the routine includes determining whether the feedgas soot level is less than a threshold soot level (e.g., first soot threshold) and determining whether the particulate filter soot load is less than a threshold soot load (e.g., second soot threshold). In other words, the controller determines whether operating conditions of the engine result in decreased soot generation (in the form of soot entrained in exhaust gas leaving the engine and entering the exhaust system) and whether the current soot load being stored in the particulate filter (e.g., soot storage at the particulate filter) is less than a threshold soot load. As previously described, engine feedgas soot levels or amounts may be modeled and may be determined primarily as a function of one or more of an engine speed, an engine coolant temperature, an air-fuel ratio, and torque. Ambient and other engine operating conditions may also affect feedgas soot levels. It will be appreciated that feedgas soot, or exhaust gas soot, may be the amount of soot entrained in exhaust gas leaving the engine and entering the exhaust system. One example of typical operating conditions that may generate feedgas with soot levels below the threshold soot level (e.g., first soot threshold) is when the engine coolant temperature is above a threshold engine temperature (e.g., when the engine is warm), when the air-fuel ratio is near stoichiometry, and when the engine is not operating in compression injection mode.

In one example, the routine determines the engine feedgas soot levels using the engine feedgas soot model based one or more of an engine speed, engine coolant temperature, torque, and air-fuel ratio. For example, the controller may estimate a current feedgas soot level based on the feedgas soot model stored in a memory of the controller. Based on indications of engine speed (such as from the output of Hall effect sensor 120 of FIG. 1), engine coolant temperature (such as from engine coolant temperature sensor 116 of FIG. 1), and an air-fuel ratio (such as form the output of exhaust gas sensor 128 of FIGS. 1-2), the controller may determine an estimated current feedgas soot level. The controller may then compare the estimated current feedgas soot level with the first soot threshold to determine whether the estimated current feedgas soot level exceeds the first soot threshold.

The routine may similarly determine a PF soot load using the PF soot load model based on one or more of the estimated current feedgas soot level as described above, engine speed and load, and an indication of an exhaust backpressure at the proximate the entrance of the PF (such as from pressure sensor 15 of FIGS. 1-2). For example, the controller may estimate a current PF soot load (e.g., amount of soot stored in the PF) based on the PF soot model stored in the memory of the controller. Based on the indications of the engine parameters described above, the controller may determine a current PF soot load, and compare the current PF soot load with the second soot threshold. Soot loading may be cumulative up until the time of a PF regeneration, and the PF soot model may update accordingly. It will be appreciated that the controller may maintain a similar PF ash model for monitoring the level of ash stored in the PF.

Responsive to the controller determining that one or both of the feedgas soot level and the PF soot load is above the first soot threshold or second soot threshold, respectively, the controller may send a command signal to an actuator of the bypass valve in order to decrease the opening of the bypass passage. As a result, an increased quantity of exhaust gas may pass through the particulate filter rather than bypassing it. As another example, the controller may make a logical determination (e.g., regarding a position of bypass valve 17) based on logic rules that are a function of one or more of engine parameters including engine speed and load, engine coolant temperature, and pressure proximate the upstream side of the particulate filter. Responsive to individual engine parameters being above or below respective thresholds, the controller may then generate a control signal that is sent to the actuator of the bypass valve in order to adjust the position of the bypass valve and control the amount of exhaust gas bypassing the particulate filter.

In one example, the determination of when to adjust the flow of exhaust gas through the bypass passage may be empirically determined and stored in predetermined lookup tables or functions. For example, one table may correspond to determining feedgas soot levels and one table may correspond to determining particulate filter soot loads. The two tables may be indexed to engine operating conditions, such as engine speed and engine load, engine coolant temperature, and air-fuel ratio, among other engine operating conditions. Furthermore, the tables may output a position of the bypass valve to allow a desired amount of exhaust gas through the bypass passage around the particulate filter.

As previously described, the controller may also estimate and/or measure a PF soot load (e.g., the amount of soot stored in the PF). The PF soot load may be determined based on the output of one or more pressure sensors proximate the particulate filter and/or from a particulate filter soot model. The threshold soot load in the particulate filter (e.g., second soot threshold) may be defined as the upper threshold of carbon particles from incomplete combustion (e.g., soot) that may collect in the particulate filter before causing a prohibitive restriction of exhaust gas flow through the particulate filter that may result in decreased fuel economy and degraded engine performance. In one example, the threshold soot load may be defined in terms of an upper threshold of exhaust backpressure upstream of the particulate filter. When an exhaust backpressure above the exhaust backpressure upper threshold is indicated by the pressure sensor, the controller may infer that a soot load in the particulate filter is above the second soot threshold.

In this way, the controller may determine whether one or more of the soot load of the PF is greater than the first threshold load and the soot generation at the cylinders is greater than the second threshold amount. If only one or neither of the conditions are met at 304, then the routine proceeds to 306, where the routine includes reducing the flow (e.g., amount of exhaust gas flow from engine cylinders) through the particulate filter bypass (e.g., particulate filter bypass passage 19 of FIGS. 1 and 2). In one example, reducing the flow through the particulate filter bypass includes decreasing the degree of opening of the bypass valve positioned in the particulate filter bypass passage. For example, the controller may determine a control signal to send to the bypass valve actuator, such as a duty cycle of the solenoid of the bypass valve, based on a determination of the soot load of the particulate filter and/or the soot level of the exhaust gas entering the exhaust system (e.g., feedgas soot). In one example, responsive to an indication of an engine coolant temperature from an engine coolant temperature and an indication of an engine speed from a Hall effect sensor, the controller may determine the soot level of the exhaust gas from the engine is above the first soot threshold. The estimation of soot level of the exhaust gas may be based on a model of exhaust gas soot levels based on engine coolant temperature, engine operating conditions, and an air-fuel ratio. In this way, the exhaust contains sufficient soot (e.g., particulate matter) to be routed through the particulate filter. Because the soot level of the exhaust gas is above the threshold soot level, even if the soot load of the particulate filter is below the second soot threshold, the controller may send a control signal to the actuator of the bypass valve in order to decrease the opening of the bypass valve, thereby increasing the amount of exhaust gas passing through the particulate filter, and decreasing the amount of exhaust gas passing through the bypass passage.

As another example, the controller may make a logical determination (e.g., regarding a position of the actuator of the bypass valve) based on logic rules that are a function of exhaust backpressure, as may be indicated by the output of a pressure sensor proximate the particulate filter. The controller may then generate a control signal that is sent to the actuator of the bypass valve in order to adjust the degree of opening of the bypass valve. In this way, the opening of the particulate filter bypass may be reduced in response to exhaust backpressure above a threshold backpressure, which may be indicative of a soot load on the particulate filter above the second soot threshold. As previously mentioned, reducing the opening of the particulate filter bypass may include fully closing the bypass valve disposed in a bypass passage disposed around only the particulate filter, and not additional devices or catalysts positioned upstream of the particulate filter. As previously mentioned the bypass valve may be fully adjustable between a fully open position (e.g., maximum degree of opening of 100%) and a fully closed position (e.g., minimum degree of opening of 0%). Thus, in some examples, the method at 306 may include partially closing the bypass valve, with the amount of closing is based on the determined feedgas soot levels and the determined particulate filter soot load, where the amount of closing increases as the feedgas soot levels and/or particulate filter soot load increase.

The routine then proceeds to 308, where the routine includes determining whether deceleration fuel shut-off (DFSO) entry conditions have been met. DFSO entry conditions may include, but are not limited to, an accelerator pedal (e.g., input device 132 of FIG. 1) not being depressed (such as during a tip-out), a decrease in vehicle speed (e.g., where vehicle speed is decreasing over a duration of time such that the vehicle is decelerating), and/or a brake pedal being depressed. A throttle position sensor signal (e.g., TP of FIG. 1) may be used to determine the accelerator pedal position (e.g., a pedal position). A throttle position may be less open as a pedal position inclines (e.g., becomes less depressed). Additionally or alternatively, a pedal position sensor (e.g., pedal position sensor 134 of FIG. 1) may be used to determine the pedal position and send a pedal position (PP) signal to a controller (e.g., controller 12 of FIG. 1). Vehicle deceleration may be determined via a second vehicle speed sensor reading being less than a first vehicle speed sensor reading. The first vehicle speed sensor reading is measured before the second vehicle speed sensor reading (e.g., five seconds prior) with no other vehicle speed sensor readings being measured between the first vehicle speed sensor reading and the second vehicle speed sensor reading. The brake pedal being depressed may be determined via a brake pedal sensor. In some embodiments, other suitable conditions may exist for DFSO to occur.

In some embodiments, a GPS/navigation system may be used to predict when DFSO conditions will be met. Information used by the GPS to predict DFSO conditions being met may include but is not limited to route direction, topographical data including road grade, traffic information, and/or weather information. As an example, the GPS may be able to detect traffic downstream of a driver's current path and predict one or more of the DFSO condition(s) occurring. By predicting one or more DFSO condition(s) being met, the controller may be able to plan when to initiate DFSO.

If the DFSO entry conditions are not met, then the routine continues to 310, where the routine includes maintaining current engine operation and regenerating the particulate filter based on engine operating conditions. In one example, this may include passively regenerating the particulate filter when engine operating conditions naturally cause an exhaust gas temperature to increase to a level that is above the regeneration temperature of the particulate filter. In other examples, this may include the controller intrusively adjusting engine operating parameters in order to increase the exhaust gas temperature to reach regeneration temperatures and actively regenerate the particulate filter. In some examples, active regeneration may include the controller sending a command signal to an ignition system (e.g., ignition system 188 of FIG. 1) in order to retard the spark delivered to one of more cylinder (e.g., cylinder 14 of FIG. 1) of the engine via a spark plug (e.g., spark plug 192 of FIG. 1). The routine then ends and exits.

If the DFSO entry conditions are met at 308, then the routine continues to 312, where the routine includes determining whether the particulate filter temperature is greater than a first upper threshold temperature. In some examples, the particulate filter temperature may be estimated based on the temperature of the exhaust proximate the particulate filter (as may be indicated by temperature sensor 16 of FIGS. 1-2). For example, the controller may determine the particulate filter temperature as a function of the measured exhaust temperature proximate to the particulate filter (e.g., directly upstream or downstream from the particulate filter) and a correction factor that correlates exhaust temperature to particulate filter. In another example, the controller may determine the particulate filter temperature using a look-up table stored in memory of the controller using the exhaust temperature as the input and the particulate filter as the output. In yet another example, the method at 312 may alternatively include determining whether the exhaust temperature of exhaust flowing through the particulate filter (as determined by an exhaust temperature sensor positioned proximate to the particulate filter in the exhaust passage) is greater than the first upper threshold temperature. In one example, the first upper threshold temperature may be a temperature above which, during DFSO, the increased levels of oxygen in the exhaust gas may increase the likelihood of the temperature of the particulate filter increasing to a level that results in particulate filter degradation. Because the exhaust gas flow through the particulate filter bypass is reduced at 312, the majority of exhaust gas (and the increased levels of oxygen as a result of DFSO operation where air may still be pumped through the engine cylinders to the exhaust) may be passing through the particulate filter rather than through the bypass passage. Thus, the temperature of the particulate filter may be monitored during this time. If the particulate filter temperature is less than the first upper threshold, there may be a reduced likelihood that the temperature of the particulate filter would reach a level at which particulate filter degradation occurs during the DFSO event. Thus, the routine then continues to 314, where the routine includes allowing DFSO and regenerating the particulate filter. In one example, this may include operating the engine in DFSO for a first duration based on an operator-demanded torque, in response to the bypass being closed and the temperature of the particulate filter being below the first upper threshold. For example, DFSO operation may only be terminated at 314 in response to an increase in operator-demanded torque (e.g., the operator pressing the accelerator pedal) and not based on the temperature of the particulate filter. It will be appreciated that passive or active regeneration of the particulate filter may occur at 314, due to the soot load of the particulate filter exceeding the second threshold soot level described at 304.

The routine then proceeds to 316, where the routine includes determining whether DFSO operation has been terminated. In some examples, terminating DFSO may include the DFSO conditions no longer being met. This may include one or more of injecting fuel to each cylinder of the engine (e.g., firing all the cylinders of an engine), the throttle no longer being at an idle condition, an accelerator pedal being depressed, and/or the brake no longer being depressed. In other examples, DFSO operation may be terminated in response to an increase in operator-demanded torque, including an increase in torque demand as indicted by an increase in pedal position of an accelerator pedal. If DFSO has not been terminated, then the routine proceeds to 318, where the routine include waiting and maintaining engine operating conditions until DFSO is terminated. In one example, this may include continuing to operate the engine in DFSO mode (e.g., no fuel delivered to any cylinder of the engine). When DFSO is terminated, the routine continues to 320, where the routine includes commencing stoichiometric combustion. In examples where the engine may be operating in a lean range (e.g., lambda greater than 1.0) as a result of the increased oxygen entrained in exhaust gas due to operating in DFSO mode, this may include decreasing the air-fuel ratio toward a lambda value of 1.0. Decreasing the air-fuel ratio toward a lambda value of 1.0 may be achieved by increasing fuel delivery to cylinders of the engine and/or decreasing air flow to the cylinders of the engine by decreasing the opening of an intake throttle, in two non-limiting examples. In this way stoichiometric combustion may commence at cylinders of the engine during the increased soot generation and increased soot storage upon termination of the DFSO. The routine then ends.

If the particulate filter temperature is greater than the first upper threshold at 312, then the routine continues to 322, where the routine includes adjusting engine operating parameters based on the temperature of the particulate filter during the DFSO event. In one example, adjusting engine operating parameters may include adjusting DFSO operation. In this way, during conditions with reduced particulate filter bypass flow, prior to terminating the deceleration fuel shut-off condition, an engine operating parameter may be adjusted to reduce an amount of oxygen flowing to the particulate filter responsive to the exhaust temperature being above the first threshold. In this way, the controller may adjust engine parameters to maintain the combustion air-fuel ratio near stoichiometric combustion, where stoichiometric combustion includes an operating condition where fuel delivered to the cylinders is combusted (e.g., burned) completely and no excess fuel or air remains after combustion. In this way, the controller may adjust engine parameters to control the amount of oxygen entering the exhaust, and thereby, entering the particulate filter as well.

In one example, adjusting the engine operating parameter to reduce the amount of oxygen flowing to the particulate filter may include one or more of activating one or more cylinder of the engine (e.g., increasing a number of cylinders of the engine that are active and combusting fuel) at 324, adjusting a throttle upstream of the cylinders of the engine (e.g., decreasing an amount of opening of a throttle positioned upstream of the cylinders to decrease airflow and thus an amount of oxygen flowing to the exhaust) at 326, and disabling one or more exhaust valves of the cylinders at 328. By disabling one or more exhaust valves of the cylinders, the exhaust valve may remain closed during the exhaust stroke, preventing and/or reducing the amount of oxygen-laden exhaust gas from entering the emission control device and passing through the particulate filter. In one example, in response to the PF temperature increasing further above the first upper threshold temperature, the controller may send command signals to increase the number of activated cylinders, increase the amount of closing of the throttle, and/or increase the number of disabled exhaust valves. As a result, a reduced flow of exhaust gas oxygen may travel downstream to the particulate filter and thus the temperature of the particulate filter may be maintained below a second upper threshold (which may be greater than the first upper threshold at 312 and may be a temperature above which degradation of the particulate filter may occur). In this way, adjustment of engine parameters may actively manage the exhaust gas from the engine to the particulate filter during DFSO operation so that the likelihood of uncontrolled oxidation of the soot in the particulate filter and potential degradation of the particulate filter may be reduced.

Further, at 330 the controller may also include the controller terminating DFSO operation after a threshold duration due to exhaust temperature being above the first upper threshold temperature. In one example, the threshold duration may be based on the exhaust temperature (e.g., particulate filter temperature), where the threshold duration may decrease as the exhaust temperature increases further above the first upper threshold temperature. Thus, in one example, if the temperature of the particulate filter increases above a second upper threshold temperature, which is greater than the first upper threshold temperature and may be a temperature above which degradation of the particulate filter occurs, the controller may terminate the DFSO operation. In other words, if the particulate filter temperature is increasing toward a temperature at which degradation of the particulate filter may occur, the DFSO operation may be run for a shorter duration in order to avoid the risk of degradation of the particulate filter. In other embodiments, the threshold duration may be additionally or optionally based on one or more of the amount of soot generation (e.g., feedgas soot level) and an amount of soot storage load in the particulate filter relative to respective thresholds. As a result, the threshold duration before terminating DFSO may decrease as the feedgas soot level and/or soot storage level in the particulate filter increase toward their respective soot thresholds. In one example, these respective soot thresholds may be identical to the first soot threshold and second soot thresholds, respectively, as described in reference to 304.

The routine then continues to 332, where the routine includes determining whether DFSO operation has been terminated. In some examples, terminating DFSO may include the DFSO conditions no longer being met. This may include one or more of injection of fuel to each cylinder of the engine (e.g., firing all the cylinders of an engine), the throttle no longer being at an idle condition, and the brake no longer being depressed. Termination of DFSO may have also been a result of the controller terminate DFSO after a threshold duration due to exhaust temperature being above the first upper threshold temperature. In this way, the DFSO may have been operated for a shorter duration in order to avoid the risk of degradation of the particulate filter. In other examples, termination of DFSO may be in response to an increase in operator-demanded torque.

If DFSO has not been terminated, then the routine proceeds to 334, where the routine include waiting and maintaining engine operating conditions until DFSO is terminated. In one example, this may include continuing to operate the engine in DFSO mode (e.g., no fuel delivered to any cylinder of the engine). When DFSO is terminated, the routine continues to 320, where the routine includes commencing stoichiometric combustion. In examples where the engine may be operating in a lean range (e.g., lambda greater than 1.0) as a result of the increased oxygen entrained in exhaust gas due to operating in DFSO mode, this may include decreasing the air-fuel ratio toward a lambda value of 1.0. Decreasing the air-fuel ratio toward a lambda value of 1.0 may be achieved by increasing fuel delivery to cylinders of the engine and/or decreasing air flow to the cylinders of the engine by decreasing the opening of an intake throttle, in two non-limiting examples. Upon terminating DFSO, stoichiometric combustion at cylinders of the engine may commence during the increased soot generation or increased soot storage in the particulate filter. The routine then ends.

If, at 304, the routine determines the feedgas soot level is less than the threshold soot level (e.g., first soot threshold) and determines the particulate filter soot load is less than the threshold soot load (e.g., second soot threshold), then the routine proceeds to FIG. 4, as described below.

Turning now to FIG. 4, it shows a flow chart illustrating an example method 400 for performing a DFSO after increasing flow through the bypass of the emission control device. Method 400 may be performed as part of method 300. For example, in response to a feedgas soot level less than the first soot threshold and the particulate filter soot load less than the second soot threshold, method 400 may be performed. Responsive to a feedgas soot level less than the first soot threshold and the particulate filter soot load less than the second soot threshold, the flow of exhaust gas through the particulate filter bypass is increased at 402. Specifically, the controller may send a command signal to an actuator of the particulate filter bypass valve to increase the opening of the particulate filter bypass valve, allowing an increased quantity of exhaust gas to bypass the particulate filter rather than passing through the particulate filter. In some examples, increasing the opening of the particulate filter bypass valve may include fully opening the filter bypass valve to a maximum degree of opening (e.g., 100%). In this way, a maximum amount of exhaust gas flow may bypass the particulate filter. It will be appreciated that even when the bypass valve is fully open, some exhaust gas may continue to flow through the particulate filter, in some examples.

The routine then continues to 404, where the routine includes determining whether DFSO entry conditions have been met, as described above in reference to 308 of FIG. 3. If DFSO entry conditions are not met, as may occur during a cold start condition, when the engine is under a high load, or when the operator is requesting torque to accelerate the vehicle, then the routine continues to 406, where the routine includes maintaining engine operation. In one example, this may include continuing to deliver fuel to cylinder of the engine for combustion and operating the engine in order to meet operator torque demand. The routine then ends.

If DFSO entry conditions are met, then the routine continues to 408, where the routine includes operating in the DFSO mode (by disabling fuel to the engine cylinders and continuing to pump air through the engine cylinders to the exhaust passage) as demanded without limiting (or adjusting) DFSO operation based on the temperature of the particulate filter. Specifically, the engine may be operated in the DFSO mode for a first duration based on an operator-demanded torque, in response to the particulate filter bypass around the particulate filter the exhaust passage of the engine being opened. The first duration may be based on the duration for which the DFSO entry conditions continue to be met, as described above in reference to 308. In this way, the DFSO operation may be operated without regard for the temperature of the particulate filter when the bypass valve is open. In one example, responsive to an indication that the particulate filter bypass valve is open and combustion exhaust gases are flowing through the bypass passage around the particulate filter, the engine may continue to operate in DFSO if the DFSO entry conditions described at 308 are met, even when the temperature of the particulate filter may exceed a first threshold temperature (e.g., the first upper threshold temperature at 312). The first threshold temperature may be the temperature above which the particulate filter temperature is closely monitored when the opening of the bypass valve is decreased (e.g., closed) and subsequent DFSO operation may be limited responsive to the temperature of the particulate filter in addition to other engine operating conditions, such as the soot level of the feedgas and the amount of soot stored in the particulate filter. In one example, the first threshold temperature may be a temperature at which regeneration of the particulate filter occurs (e.g., regeneration temperatures).

The routine then proceeds to 410, where the routine includes determining whether DFSO operation has been terminated. In some examples, terminating DFSO may include the DFSO conditions no longer being met. This may include one or more of injection of fuel to each cylinder of the engine (e.g., firing all the cylinders of an engine), the throttle no longer being at an idle condition, an accelerator pedal being depressed, and/or the brake no longer being depressed. In other examples, DFSO operation may be terminated in response to an increase in operator-demanded torque (e.g., such as in response to an increase in pedal position of an accelerator pedal). If DFSO has not been terminated, then the routine proceeds to 412, where the routine include waiting and maintaining engine operating conditions until DFSO is terminated. In one example, this may include continuing to operate the engine in DFSO mode (e.g., no fuel delivered to any cylinder of the engine). When DFSO is terminated, the routine continues to 414, where the routine includes commencing stoichiometric combustion as described in reference to 320 of FIG. 3. The routine then ends.

Turning now to FIG. 5, map 500 shows a prophetic operation of an engine including controlling flow through a bypass around an emission control device and adjusting DFSO operation responsive to the flow through the bypass and a temperature of the emission control device. Further, engine parameters, including DFSO operation, may be adjusted and/or terminated responsive to a position of the bypass valve and/or a temperature of the particulate filter. Map 500 includes various engine parameters along the vertical axis, and elapsed time along the horizontal axis. Map 500 depicts accelerator pedal position (PP) at plot 502 which is indicative of operator torque demand. Map 500 further depicts an air-fuel ratio at plot 504 relative to a stoichiometric air-fuel ratio at 503, a feedgas soot level (e.g., exhaust gas soot level) at plot 506 relative to a first soot threshold at 505. Map 500 also depicts a particulate filter (PF) soot load at plot 508, relative to a second soot threshold at 507, a position (e.g., degree of opening) of the bypass valve positioned in the bypass passage around the particulate filter at plot 510, and an exhaust backpressure at plot 512, relative to a threshold exhaust backpressure at 511. Additionally, DFSO operation is shown at plot 514, and a particulate filter temperature is shown at plot 516, relative to a regeneration temperature threshold at 513, a first upper threshold at 515, and a second upper threshold at 517. Finally, particulate filter regeneration is shown at 518.

Prior to time t1, an operator is requesting torque, as indicated by an increasing actuation of the accelerator pedal (plot 502). As a result, the engine is operated with a rich air-to fuel ratio (plot 504), with a lambda less than stoichiometric air-fuel ratio at 503. As a result of running the engine rich, the feedgas soot may be elevated (plot 506) above a first soot threshold (plot 505). The soot load of the particulate filter may increase (plot 508) toward a second soot threshold (plot 507) as the soot from the feedgas accumulates into the particulate filter. Because the PF soot load is below the second soot threshold 507 but the feedgas soot is above the first soot threshold 505, the PF bypass valve remains closed prior to time t1 (plot 510). The exhaust backpressure (plot 512) may increase toward a threshold exhaust backpressure 511 as the PF soot load increases. The engine is not operated in DFSO mode (plot 514), as there is an operator torque demand.

At time t1, the operator stops requesting acceleration and requests a steady torque from the engine as indicated by stable actuation of the accelerator pedal (plot 502). As a result, the engine does not operate in DFSO (plot 514). The air-fuel ratio may trend toward stoichiometry (plot 504), and the feedgas soot level (506) may drop below the first soot threshold (dashed plot 505) at time t1. At the same time, the PF soot load (plot 508) remains below the second soot threshold 507, and therefore the opening of the PF bypass valve may be increased (plot 510). In the depicted embodiment, the PF bypass valve is fully opened, but it will be appreciated that the valve opening may alternatively be increased without being fully opened. As a result of the exhaust gas now able to substantially bypass the particulate filter, the soot load of the particulate filter does not continue to increase (plot 508), nor does the exhaust backpressure (plot 512). However, the temperature of the particulate filter may continue to increase gradually (plot 516) as a result of continued engine operation and exhaust gas flowing through the particulate filter, but the temperature of the particulate filter remains below regeneration temperatures (plot 518) so regeneration does not occur.

At time t2, there is a decrease in actuation of the accelerator pedal (plot 502). This may be the result of an operator tip-out. Responsive to DFSO conditions being met at time t2, the engine enters DFSO mode (plot 514), and fuel is no longer delivered to cylinders of the engine. As a result, the air-fuel ratio goes lean (plot 504) and the feedgas soot levels decrease (plot 506). Also at time t2, the particulate filter bypass is open (plot 510), and the particulate filter soot load (plot 508) and exhaust backpressure (plot 512) do not continue to increase. The particulate filter temperature (pot 516) continues to remain below regeneration temperature (dashed plot 513) and so regeneration does not occur (518).

Operating conditions remain steady until time t3, at which time there is an operator torque request, as indicated by the accelerator pedal (plot 502). Depression of the accelerator pedal causes DFSO entry conditions to no longer be met, and so time t3 ends the first duration D1 of DFSO. In this way, the first duration D1 (e.g., t2-t3) is terminated based on an operator torque demand, and not based on the temperature of the particulate filter. At time t3, the air-fuel ratio decreases toward rich (plot 504) and the feedgas soot level increases (plot 506). Responsive to the feedgas soot level increasing above the first soot threshold (plot 505), the bypass valve is closed (plot 510). The particulate filter soot load (plot 508) also increases above the second soot threshold (plot 507). In this way, the engine is operated in DFSO for the first duration based on an operator-demanded torque, in response to the bypass around the particulate filter disposed in the exhaust passage of the engine being open.

At time t4, the accelerator pedal continues to be depressed (plot 502). Also at t4, the temperature of the particulate filter (plot 516) increases above a regeneration threshold temperature (dashed plot 513) and so regeneration may commence at t4 (plot 518). At the same time, the feedgas soot level (plot 506) is above the first soot threshold (dashed plot 505) and the soot load of the particulate filter (plot 508) is above the second soot threshold (dashed plot 507), and so the particulate filter bypass is closed (plot 510). As a result of particular filter regeneration, a quantity of soot in the particulate filter is oxidized and purged and so the exhaust backpressure decreases (plot 512) away from a threshold exhaust backpressure (plot 511) as a result of the regeneration between t4 and t6.

At time t5, there is another sudden relief of accelerator pedal depression (plot 502). As a result, DFSO entry conditions are met and the engine begins to operate in DFSO mode (plot 514). The air-fuel ratio is lean (plot 504) and the feedgas soot decreases (plot 506) but the particulate filter soot load (plot 508) remains above the second soot threshold (dashed plot 507) and so the particulate filter bypass valve remains closed (plot 510). The temperature of the particulate filter continues to increase as the regeneration operation continues, in part a result of the increased oxygen levels in the exhaust gas entering the particulate filter during regeneration. Because the particulate filter temperature at t5 was above the first upper threshold temperature (515) when DFSO began, the controller monitors the temperature of the particulate filter during DFSO. When the temperature of the particulate filter reaches the second upper threshold temperature (517), DFSO is terminated. In this way, DFSO is operated for a second duration D2, responsive to the temperature of the particulate filter reaching the second upper threshold temperature 517 when the particulate filter bypass valve is closed. Had the particulate filter bypass valve been open between t5 and t6, the DFSO may have lasted a third duration D3 (e.g., t5-t6) before being terminated. Duration D3, DFSO would have been terminated as a result of DFSO entry conditions not being met, not as a result of a temperature of the particulate filter reaching the upper threshold.

At time t6, the regeneration ends (plot 518), and the bypass valve reopens (plot 510) as a result of the feedgas soot level (plot 506) below the first soot threshold 505 and the soot load of the particulate filter (plot 508) returning below the second soot threshold 507 as a result of the regeneration. The temperature of the particulate filter (plot 516) drops as a result of opening the bypass valve.

In this way, under operating conditions when the particulate matter load in exhaust gas is lower, a portion of exhaust may bypass the particulate filter, reducing exhaust back pressure and thereby improving fuel economy. Furthermore, by not flowing exhaust gas through the particulate filter during all driving conditions, soot and ash accumulation in the particulate filter may be reduced, thereby increasing the life of the particulate filter.

When exhaust gas bypasses the particulate filter, the likelihood of excessive exotherms across the particulate filter during DFSO mode is reduced, and DFSO may be performed without regard for the temperature of the particulate filter. When particulate filter regeneration is desired, flow through the bypass is decreased, and DFSO operation during the decreased bypass flow may be adjusted responsive to particulate filter temperatures. In this way, the amount of oxygen flowing through the particulate filter may be decreased while still performing a particulate filter regeneration during DFSO. As a result, the filter may not exceed a maximum allowed particulate filter temperature, thereby reducing the likelihood of a particulate filter degradation, while completing the particulate filter regeneration.

The technical effect of increasing the opening of the bypass valve responsive to decreased soot levels in the feedgas and a decreased amount of soot stored in the particulate filter is that the filter life may be extended as a result of more selective use of the particulate filter. Additionally, DFSO may not be limited by the temperature of the particulate filter when the bypass valve is open, and fuel economy may be increased while still meeting reduced emissions requirements. The technical effect of decreasing the opening of the bypass valve responsive to increased soot levels in the feedgas or an increased amount of soot stored in the particulate filter is that emissions reduction and/or particulate filter regeneration may be performed as desired. Further, when the bypass valve is closed, DFSO may be adjusted and/or terminated when the exhaust temperature is above a temperature threshold such that the increased oxygen content of the exhaust gas during DFSO does not contribute to degradation of the particulate filter.

A method for an engine includes: responsive to decreased soot generation or decreased soot storage, flowing gasoline combustion exhaust gas to a particulate filter with increased filter bypass flow even when an exhaust temperature is above a first threshold; and responsive to increased soot generation or increased soot storage, reducing the filter bypass flow and terminating deceleration fuel shut-off operation after a threshold duration due to exhaust temperature being above the first threshold. In a first example of the method, the method further includes wherein the exhaust temperature is a temperature of the particulate filter. A second example of the method optionally includes the first example and further includes during the flowing gasoline combustion exhaust gas to the particulate filter with increased filter bypass flow, and in response to a request to operate the engine with deceleration fuel shut-off, operating the engine with deceleration fuel shut-off even when the exhaust temperature is above the first threshold. A third example of the method optionally includes one or more of the first and second examples, and further includes terminating the deceleration fuel shut-off operation in response to an increase in operator-demanded torque. A fourth example of the method optionally includes one or more of the first through third examples, and further includes commencing stoichiometric combustion at engine cylinders of the engine during the increased soot generation or increased soot storage upon terminating the deceleration fuel shut-off operation. A fifth example of the method optionally includes one or more of the first through fourth examples, and further includes wherein the threshold duration is based on the exhaust temperature, where the duration decreases as the exhaust temperature increases further above the first threshold. A sixth example of the method optionally includes one or more of the first through fifth examples, and further includes further comprising, during the reducing the filter bypass flow responsive to increased soot generation or increased soot storage, prior to terminating the deceleration fuel shut-off condition, adjusting an engine operating parameter to reduce an amount of oxygen flowing to the particulate filter responsive to the exhaust temperature being above the first threshold. A seventh example of the method optionally includes one or more of the first through sixth examples, and further includes wherein adjusting the engine operating parameter to reduce the amount of oxygen flowing to the particulate filter includes one or more of increasing a number of cylinders of the engine that are active and combusting fuel, decreasing an amount of opening of a throttle positioned upstream of the cylinders, and disabling one or more cylinder exhaust valves of the cylinders. An eighth example of the method optionally includes one or more of the first through seventh examples, and further includes wherein flowing gasoline combustion exhaust gas to the particulate filter with increased filter bypass flow includes increasing an amount of opening of a bypass valve disposed in a bypass passage coupled around the particulate filter, where the filter bypass flow only bypasses the particulate filter and not additional devices or catalysts positioned upstream of the particulate filter. A ninth example of the method optionally includes one or more of the first through eighth examples, and further includes wherein reducing the filter bypass flow includes decreasing the amount of opening of the bypass valve. A tenth example of the method optionally includes one or more of the first through ninth examples, and further includes wherein the gasoline combustion exhaust gas is generated via spark-ignition and wherein the engine is a direct injection turbocharged engine. An eleventh example of the method optionally includes one or more of the first through tenth examples, and further includes wherein the decreased soot generation includes decreased soot generation at cylinders of the engine and the decreased soot storage includes decreased soot storage within the particulate filter.

In another example, a method for an engine includes: responsive to entry conditions for deceleration fuel shut-off (DFSO) operation being met: operating the engine in DFSO for a first duration based on an operator-demanded torque, in response to a bypass around a gasoline particulate filter (GPF) disposed in an exhaust passage of the engine being open; and operating the engine in DFSO for a second duration based on a temperature of the GPF, in response to the bypass being closed and the temperature being above a first threshold. In a first example of the method, the method further includes operating the engine in DFSO for the first duration based on the operator-demanded torque, in response to the bypass being closed and the temperature being below the first threshold. A second example of the method optionally includes the first example and further includes wherein operating the engine in DFSO for the second duration includes terminating DFSO in response to the temperature increasing above a second threshold, the second threshold greater than the first threshold. A third example of the method optionally includes one or more of the first and second examples, and further includes opening the bypass in response to each of a soot load of the GPF being less than a first threshold load and soot generation at cylinders of the engine being less than a second threshold amount and closing the bypass in response to one or more of the soot load of the GPF being greater than the first threshold load and the soot generation at the cylinders being greater than the second threshold amount. A fourth example of the method optionally includes one or more of the first through third examples, and further includes during operation of the engine in DFSO for the second duration, adjusting an engine operating parameter to reduce a combustion air-fuel ratio of the engine.

A system for an engine includes an exhaust passage including a turbocharger turbine and a catalyst; a gasoline particulate filter (GPF) disposed in the exhaust passage, downstream of the turbocharger turbine and catalyst; a bypass passage disposed around only the GPF and including a bypass valve disposed therein; and a controller with computer readable instructions stored in memory for: opening the bypass valve in response to a soot level of exhaust gas being less than a first threshold and a soot level stored in the GPF being less than a second threshold and, in response to the bypass valve being open during a deceleration fuel shut-off (DFSO) operation, not limiting a duration of the DFSO operation based on a temperature of the GPF; and closing the bypass valve in response to one or more of the soot level of the exhaust gas being greater than the first threshold and the soot level stored in the GPF being greater than the second threshold, and, in response to the bypass valve being closed during DFSO operation and the temperature of the GPF being above a first upper threshold, limiting the duration of the DFSO operation based on the temperature of the GPF. In a first example of the system, the system further includes wherein the computer readable instructions further include instructions for: in response to the bypass valve being closed during DFSO operation and the temperature of the GPF being below the first upper threshold, not limiting the duration of the DFSO operation based on the temperature of the GPF. A second example of the system optionally includes the first example and further includes wherein the engine is a direct-injection, spark-ignited gasoline engine and wherein the computer readable instructions further include instructions for: during DFSO operation while the bypass valve is closed and the temperature of the GPF is above the first upper threshold, adjusting a parameter of the engine to maintain a combustion air-fuel ratio within a threshold of stoichiometry and terminating DFSO operation in response to the temperature of the GPF increasing above a second upper threshold, the second upper threshold greater than the first upper threshold.

In another representation, a method for an engine includes: responsive to entry conditions for deceleration fuel shut-off (DFSO) operation being met: operating the engine in DFSO and allowing a combustion air-fuel ratio that is leaner than within a threshold of stoichiometry, in response to a bypass around a gasoline particulate filter (GPF) disposed in an exhaust passage of the engine being open; and operating the engine in DFSO and adjusting an engine operating parameter to maintain the combustion air-fuel ratio of the engine within the threshold of stoichiometry, in response to the bypass being closed and a temperature of the GPF being above a first threshold.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
via a controller, executing instructions stored in a non-transitory computer storage medium to, responsive to decreased soot generation or decreased soot storage as estimated based on sensors, flowing gasoline combustion exhaust gas to a particulate filter with increased filter bypass flow by controlling an amount of opening of a bypass valve when an exhaust temperature is above a first threshold, wherein the increased filter bypass flow reduces exhaust back pressure and increases a life of the particulate filter; and
responsive to increased soot generation or increased soot storage as estimated based on the sensors, reducing the filter bypass flow and terminating deceleration fuel shut-off operation after a threshold duration by injecting fuel to each cylinder of the engine due to the exhaust temperature being above the first threshold, wherein the reduced filter bypass flow and the terminating the deceleration fuel shut-off operation regenerates the particulate filter.

2. The method of claim 1, wherein the exhaust temperature is a temperature of the particulate filter.

3. The method of claim 1, further comprising, during the flowing gasoline combustion exhaust gas to the particulate filter with increased filter bypass flow, and in response to a request to operate the engine with deceleration fuel shut-off, operating the engine with deceleration fuel shut-off even when the exhaust temperature is above the first threshold.

4. The method claim 3, further comprising terminating the deceleration fuel shut-off operation in response to an increase in operator-demanded torque.

5. The method of claim 1, further comprising commencing stoichiometric combustion at engine cylinders of the engine during the increased soot generation or increased soot storage upon terminating the deceleration fuel shut-off operation.

6. The method of claim 1, wherein the threshold duration is based on the exhaust temperature, where the threshold duration decreases as the exhaust temperature increases further above the first threshold.

7. The method of claim 1, further comprising, during the reducing the filter bypass flow responsive to increased soot generation or increased soot storage, prior to terminating the deceleration fuel shut-off operation, adjusting an engine operating parameter to reduce an amount of oxygen flowing to the particulate filter responsive to the exhaust temperature being above the first threshold.

8. The method of claim 7, wherein adjusting the engine operating parameter to reduce the amount of oxygen flowing to the particulate filter includes one or more of increasing a number of cylinders of the engine that are active and combusting fuel, decreasing an amount of opening of a throttle positioned upstream of the cylinders, and disabling one or more cylinder exhaust valves of the cylinders.

9. The method of claim 1, wherein flowing gasoline combustion exhaust gas to the particulate filter with increased filter bypass flow includes increasing an amount of opening of a bypass valve disposed in a bypass passage coupled around the particulate filter, where the filter bypass flow only bypasses the particulate filter and not additional devices or catalysts positioned upstream of the particulate filter.

10. The method of claim 9, wherein reducing the filter bypass flow includes decreasing the amount of opening of the bypass valve.

11. The method of claim 1, wherein the gasoline combustion exhaust gas is generated via spark-ignition and wherein the engine is a direct injection turbocharged engine.

12. The method of claim 1, wherein the decreased soot generation includes decreased soot generation at cylinders of the engine and the decreased soot storage includes decreased soot storage within the particulate filter.

13. A method for an engine, comprising:
via a controller, executing instructions stored in a non-transitory computer storage medium to, responsive to entry conditions for deceleration fuel shut-off (DFSO) operation being met;
operating the engine in DFSO for a first duration based on an operator-demanded torque, in response to a bypass around a gasoline particulate filter (GPF) disposed in an exhaust passage of the engine being open, wherein the bypass being open reduces exhaust back pressure and increases a life of the GPF; and
operating the engine in DFSO for a second duration based on a temperature of the GPF, in response to the bypass being closed and the temperature being above a first threshold, wherein the bypass being closed and the operating the engine in DFSO for the second duration regenerates the GPF.

14. The method of claim 13, further comprising operating the engine in DFSO for the first duration based on the operator-demanded torque, in response to the bypass being closed and the temperature being below the first threshold.

15. The method of claim 13, wherein operating the engine in DFSO for the second duration includes terminating DFSO operation in response to the temperature increasing above a second threshold, the second threshold greater than the first threshold.

16. The method of claim 13, further comprising opening the bypass in response to each of a soot load of the GPF being less than a first threshold load and soot generation at cylinders of the engine being less than a second threshold amount and closing the bypass in response to one or more of the soot load of the GPF being greater than the first threshold load and the soot generation at the cylinders being greater than the second threshold amount.

17. The method of claim 13, further comprising, during operation of the engine in DFSO for the second duration, adjusting an engine operating parameter to reduce a combustion air-fuel ratio of the engine.

18. A system for an engine, comprising:
an exhaust passage including a turbocharger turbine and a catalyst;
a gasoline particulate filter (GPF) disposed in the exhaust passage, downstream of the turbocharger turbine and the catalyst;
a bypass passage disposed around only the GPF and including a bypass valve disposed therein; and
a controller with computer readable instructions stored in memory for:
opening the bypass valve in response to a soot level of exhaust gas being less than a first threshold and a soot level stored in the GPF being less than a second threshold and, in response to the bypass valve being open during a deceleration fuel shut-off (DFSO) operation, not limiting a duration of the DFSO operation based on a temperature of the GPF; and
closing the bypass valve in response to one or more of the soot level of the exhaust gas being greater than the first threshold and the soot level stored in the GPF being greater than the second threshold, and, in response to the bypass valve being closed during DFSO operation and the temperature of the GPF being above a first upper threshold, limiting the duration of the DFSO operation based on the temperature of the GPF.

19. The system of claim 18, wherein the computer readable instructions further include instructions for: in response to the bypass valve being closed during DFSO operation and the temperature of the GPF being below the first upper threshold, not limiting the duration of the DFSO operation based on the temperature of the GPF.

20. The system of claim 18, wherein the engine is a direct-injection, spark-ignited gasoline engine and wherein the computer readable instructions further include instructions for: during DFSO operation while the bypass valve is closed and the temperature of the GPF is above the first upper threshold, adjusting a parameter of the engine to maintain a combustion air-fuel ratio within a threshold of stoichiometry and terminating DFSO operation in response to the temperature of the GPF increasing above a second upper threshold, the second upper threshold greater than the first upper threshold.

* * * * *